(12) United States Patent
Nishizawa et al.

(10) Patent No.: US 11,602,946 B2
(45) Date of Patent: Mar. 14, 2023

(54) PRINTED MATTER EXHIBITING METALLIC GLOSS

(71) Applicant: MIMAKI ENGINEERING CO., LTD., Nagano (JP)

(72) Inventors: Ryo Nishizawa, Nagano (JP); Tasuku Sato, Nagano (JP); Akira Takatsu, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 3 days.

(21) Appl. No.: 17/511,526

(22) Filed: Oct. 26, 2021

(65) Prior Publication Data

US 2022/0048306 A1 Feb. 17, 2022

Related U.S. Application Data

(62) Division of application No. 16/412,374, filed on May 14, 2019, now Pat. No. 11,203,219.

(30) Foreign Application Priority Data

May 18, 2018 (JP) .............................. JP2018-096164

(51) Int. Cl.
| | | |
|---|---|---|
| *B41M 7/00* | (2006.01) | |
| *B41J 2/045* | (2006.01) | |
| *B41J 11/00* | (2006.01) | |
| *B41M 5/00* | (2006.01) | |
| *B41M 3/00* | (2006.01) | |

(52) U.S. Cl.
CPC ........ *B41M 7/0081* (2013.01); *B41J 2/04581* (2013.01); *B41J 11/002* (2013.01); *B41J 11/0021* (2021.01); *B41M 3/00* (2013.01); *B41M 5/0023* (2013.01); *B41M 7/009* (2013.01)

(58) Field of Classification Search
CPC .... C09D 11/101; C09D 11/322; B41M 7/009; B41M 7/0081; B41M 3/00; B41M 5/0023; B41J 11/0021; B41J 11/002; B41J 2/04581
See application file for complete search history.

(56) References Cited

U.S. PATENT DOCUMENTS

| | | | |
|---|---|---|---|
| 10,655,029 B2 * | 5/2020 | Fujita ................... | C09D 11/322 |
| 10,745,575 B2 * | 8/2020 | Becker .................... | C09C 1/64 |
| 2018/0009236 A1 * | 1/2018 | Hashizume ................ | B41J 2/01 |

FOREIGN PATENT DOCUMENTS

| | | |
|---|---|---|
| JP | 2010214804 | 9/2010 |
| JP | 2015033806 | 2/2015 |

(Continued)

OTHER PUBLICATIONS

"Office Action of Japan Counterpart Application", dated Oct. 26, 2021, with English translation thereof, p. 1-p. 17.

*Primary Examiner* — An H Do
(74) *Attorney, Agent, or Firm* — JCIPRNET

(57) ABSTRACT

A printed matter exhibiting metallic gloss is provided and includes: a substrate; and a metallic glossy layer, being formed on the substrate, and the metallic glossy layer containing scaly particles having a metal. In the metallic glossy layer, the scaly particles are oriented to be substantially parallel to a surface of the metallic glossy layer; and the surface of the metallic glossy layer has a DOI value of greater than or equal to 20% and a Sa value of less than or equal to 2 μm.

7 Claims, 6 Drawing Sheets

(56) References Cited

FOREIGN PATENT DOCUMENTS

| | | |
|---|---|---|
| JP | 2015089653 | 5/2015 |
| JP | 2016132244 | 7/2016 |
| JP | 2019043060 | 3/2019 |

\* cited by examiner

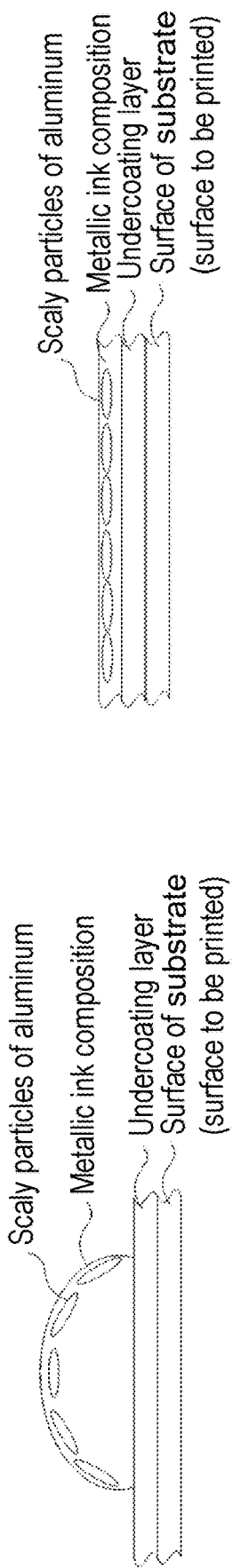
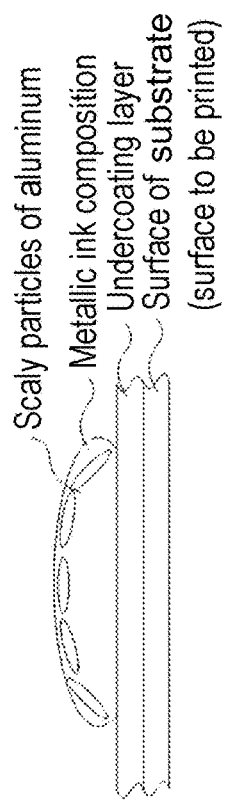
FIG. 3A
FIG. 3B
FIG. 3C

PRINTED MATTER EXHIBITING METALLIC GLOSS

CROSS REFERENCE TO RELATED APPLICATIONS

This application is a divisional application of and claims the priority benefit of U.S. patent application Ser. No. 16/412,374, filed on May 14, 2019, being allowable, which claims the priority benefit of Japanese Patent Application No. 2018-096164, filed on May 18, 2018. The entirety of the above-mentioned patent application is hereby incorporated by reference herein and made a part of this specification.

TECHNICAL FIELD

The present disclosure relates to a printed matter exhibiting a metallic gloss.

DESCRIPTION OF THE BACKGROUND ART

Conventionally, when manufacturing a printed matter exhibiting metallic gloss using an ultraviolet curable metallic ink, the metallic ink is applied to a medium, and after the film thickness of the film formed by the metallic ink becomes less than or equal to an average length (1 μm to 2 μm) of a long side of a metal piece included in the metallic ink, ultraviolet light is irradiated on the film to cure the film (see Patent Literature 1).
Patent Literature 1: Japanese Patent No. 5447043

SUMMARY

However, in the printing method described in the publication of Japanese Patent No. 5447043, only a single gloss can be obtained according to the composition of the metallic ink, and in particular, as the film is cured when the film thickness of the film formed by the metallic ink becomes thin (when the surface is smoothened to a certain degree), a printed matter exhibiting a metallic gloss of a rough texture (in appearance) cannot be obtained. Moreover, in the printed matter, irregularities in the surface of the film remains, and a metallic gloss like a mirror surface becomes difficult to obtain. As described above, in the printing method described in the publication of Japanese Patent No. 5447043, it is difficult to obtain satisfactory metallic gloss (rough metallic gloss or metallic gloss like mirror surface).

The present disclosure aims to obtain a satisfactory metallic gloss.

A manufacturing method for a printed matter exhibiting metallic gloss according to a first aspect of the present disclosure includes: an applying step of applying an ink composition onto a substrate in a form of a droplet by an inkjet method, and the ink composition containing: an external stimulus film-forming resin that forms a film by an external stimulus including radiation or heat, and scaly particles containing a metal; a standby step of providing a predetermined standby time to bring the scaly particles close to a surface of the droplet and orient the scaly particles to be substantially parallel to the surface, and to wet-spread the droplet; and a film-forming step of forming the film by applying the external stimulus to the ink composition after the standby step to form a metallic glossy layer exhibiting metallic gloss.

According to the above configuration, a satisfactory metallic gloss can be easily obtained. Furthermore, a metallic gloss with a rough texture and a metallic gloss like a mirror surface can be easily obtained by controlling the standby time.

The method may further include a step of forming a base layer of the metallic glossy layer with at least the same resin as the external stimulus film-forming resin on the substrate, before the applying step.

According to the above configuration, the metallic glossy layer can be suitably formed regardless of the material of the substrate.

A surface of the metallic glossy layer may appear smooth when the predetermined standby time is long, and the surface of the metallic glossy layer may appear rough when the predetermined standby time is short; and an appearance of the metallic glossy layer may be controlled by adjusting the predetermined standby time.

According to the above configuration, the degree of metallic gloss (degree of roughness, specularity, etc.) can be easily controlled.

The predetermined standby time may be set so that the surface of the metallic glossy layer has at least one of the following physical properties,
a) Rspec value is greater than or equal to 10 GU or greater than or equal to 50 GU,
b) Sa value is less than or equal to 2 μm,
c) DOI value is greater than or equal to 20%,
d) GLOSS value is greater than or equal to 100 GU,
e) Sz value is less than or equal to 4 μm,
f) Vvc value is less than or equal to 4 ml/m$^2$,
g) Coating film height is greater than or equal to 3 μm and less than or equal to 30 μm.

According to the above configuration, the degree of metallic gloss can be objectively evaluated by the parameters described above, so that quality control can be more accurately performed as compared with the conventional method that relies on evaluation of the metallic gloss by visual observation.

The predetermined standby time may be set so that the surface of the metallic glossy layer has at least one of the following physical properties,
a) Log HAZE value is greater than or equal to 200 and less than or equal to 1400 or greater than or equal to 300 and less than or equal to 900,
b) Sdq value is greater than or equal to 0.7 and less than or equal to 2,
c) GLOSS value is greater than or equal to 15 GU and less than 100 GU,
d) Sdr value is less than or equal to 2,
e) Spc value is greater than or equal to 1000 mm$^{-1}$ and less than or equal to 2200 mm$^{-1}$,
f) Vvc value is greater than or equal to 1.5 ml/m$^2$ and less than or equal to 5.8 ml/m$^2$.

According to the above configuration, the degree of metallic gloss can be objectively evaluated by the parameters described above, so that quality control can be more accurately performed as compared with the conventional method that relies on evaluation of the metallic gloss by visual observation.

A printed matter exhibiting metallic gloss according to a second aspect of the present disclosure includes: a substrate; and a metallic glossy layer, being formed on the substrate and the metallic glossy layer containing scaly particles having a metal. In the metallic glossy layer, the scaly particles are oriented to be substantially parallel to a surface of the metallic glossy layer; and the surface of the metallic glossy layer has a DOI value of greater than or equal to 20% and a Sa value of less than or equal to 2 μm.

According to the above configuration, a printed matter having a metallic glossy layer exhibiting an excellent metallic gloss like a mirror surface is provided. Furthermore, as the degree of metallic gloss can be objectively evaluated by the parameters described above, quality control can be more accurately performed as compared with the conventional method that relies on evaluation of the metallic gloss by visual observation.

The surface of the metallic glossy layer may further have at least one of the following physical properties, a) Rspec value is greater than or equal to 10 GU or greater than or equal to 50 GU, b) GLOSS value is greater than or equal to 100 GU, c) Sz value is less than or equal to 4 μm, d) Vvc value is less than or equal to 4 ml/m$^2$, e) Coating film height is greater than or equal to 3 μm and less than or equal to 30 μm.

According to the above configuration, more excellent metallic gloss can be obtained. Furthermore, as the degree of metallic gloss can be objectively evaluated by the parameters described above, quality control can be more accurately performed as compared with the conventional method that relies on evaluation of the metallic gloss by visual observation.

A printed matter exhibiting metallic gloss according to a third aspect of the present disclosure includes: a substrate; and a metallic glossy layer, being formed on the substrate, and the metallic glossy layer containing scaly particles having a metal. The metallic glossy layer includes a plurality of protrusions; and the scaly particles are oriented substantially in parallel with a surface of the protrusion in each of the plurality of protrusions.

According to the above configuration, a printed matter including a glossy layer exhibiting metallic gloss having a rough texture (matte texture) is provided.

A surface of the metallic glossy layer may have a log HAZE value of greater than or equal to 200 and less than or equal to 1400, and an Sdq value of greater than or equal to 0.7 and less than or equal to 2.

According to the above configuration, a metallic gloss having a more preferable texture can be obtained. Furthermore, as the degree of metallic gloss can be objectively evaluated by the parameters described above, quality control can be more accurately performed as compared with the conventional method that relies on evaluation of the metallic gloss by visual observation.

The surface of the metallic glossy layer may further have at least one of the following physical properties, a) Log HAZE value is greater than or equal to 300 and less than or equal to 900, b) GLOSS value is greater than or equal to 15 GU and less than 100 GU, c) Sdr value is less than or equal to 2, d) Spc value is greater than or equal to 1000 mm$^{-1}$ and less than or equal to 2200 mm$^{-1}$, e) Vvc value is greater than or equal to 1.5 ml/m$^2$ and less than or equal to 5.8 ml/m$^2$.

According to the above configuration, a metallic gloss having a more preferable texture can be obtained. Furthermore, as the degree of metallic gloss can be objectively evaluated by the parameters described above, quality control can be more accurately performed as compared with the conventional method that relies on evaluation of the metallic gloss by visual observation.

In the printed matter according to the second and third aspects, the metallic glossy layer includes a cured product of an external stimulus film-forming resin which forms a film by an external stimulus including radiation or heat.

According to the above configuration, the metallic glossy layer can be easily formed.

Furthermore, in the case described above, a flat layer of a cured product of the same kind of resin as the external stimulus film-forming resin may be provided between the metallic glossy layer and the substrate.

According to the above configuration, a suitable metallic glossy layer is obtained regardless of the material of the substrate.

An inkjet printer according to a fourth aspect of the present disclosure includes: a print head that ejects an ink composition onto a substrate in a form of a droplet, and the ink composition containing: an external stimulus film-forming resin which forms a film by an external stimulus including radiation or heat, and scaly particles containing a metal; a film-forming device that forms a metallic glossy layer from the ink composition by applying the external stimulus to the ink composition ejected onto the substrate; and a controller that drives the print head and the film-forming device. The controller provides a predetermined standby time from an ejection of the ink composition onto the substrate until a curing of the ink composition, so as to bring the scaly particles in the droplet of the ink composition ejected onto the substrate close to a surface of the droplet and orient the scaly particles substantially parallel to the surface; and controls a wet-spreading of the ink composition by changing a length of the predetermined standby time and changes an appearance of the ink composition after curing.

According to the above configuration, the degree of metallic gloss (degree of roughness, specularity, etc.) can be easily controlled, and a satisfactory metallic gloss can be easily obtained.

The inkjet printer may further include a moving mechanism that moves the print head along a main scanning direction and a sub scanning direction relatively to the substrate with the film-forming device. The film-forming device further includes a plurality of external stimulus output devices that output the external stimulus, the controller further controls the plurality of external stimulus output devices and the moving mechanism, the controller causes the ink composition to be ejected from the print head while moving the plurality of external stimulus output devices and the print head in the sub scanning direction by the moving mechanism; each of the plurality of external stimulus output devices is arranged along the sub scanning direction, and is sequentially passed above the ink composition ejected from the print head when relatively moving with respect to the substrate along the sub scanning direction; and the controller controls the wet-spreading of the ink composition before curing by controlling number of external stimulus output devices that are passed toward the beginning but do not output the external stimulus among the plurality of external stimulus output devices sequentially passing above the ink composition ejected from the print head.

According to the above configuration, the standby time from the application of the ink composition to the application of the external stimulus can be controlled by the simple control of changing the number of external stimulus application devices to be turned off. Furthermore, according to the present inkjet printer, for example, the manufacturing method according to the first aspect of the present disclosure can be suitably performed.

The controller may drive the print head and the film-forming device, and form a base layer of the metallic glossy layer by the ink composition.

According to the above configuration, a suitable metallic glossy layer is obtained, regardless of the material of the substrate.

The inkjet printer may further include a housing that prevents the external stimulus for forming the film from the external stimulus film-forming resin from reaching the ink composition.

According to the above configuration, the fluidity of the droplet can be reliably maintained to an extent that the droplet wet-spreads on the surface to be printed during the standby time from the application of the droplet of the ink composition to the application of the external stimulus.

The inkjet printer may further include a drying device that completely or partially evaporates a solvent contained in the ink composition.

According to the above configuration, when the ink composition contains a solvent, the solvent is evaporated to reduce the amount of solvent in the glossy ink composition to less than or equal to a predetermined amount, for example, to an extent the curing of the glossy ink composition is not inhibited.

According to the present disclosure, satisfactory metallic gloss can be obtained.

BRIEF DESCRIPTION OF THE DRAWINGS

FIGS. 3A to 3C are schematic cross-sectional views showing a state of the glossy ink composition on a substrate in the evaporation step according to a third modified example.

DESCRIPTION OF EMBODIMENTS

First Embodiment

Figure 1:
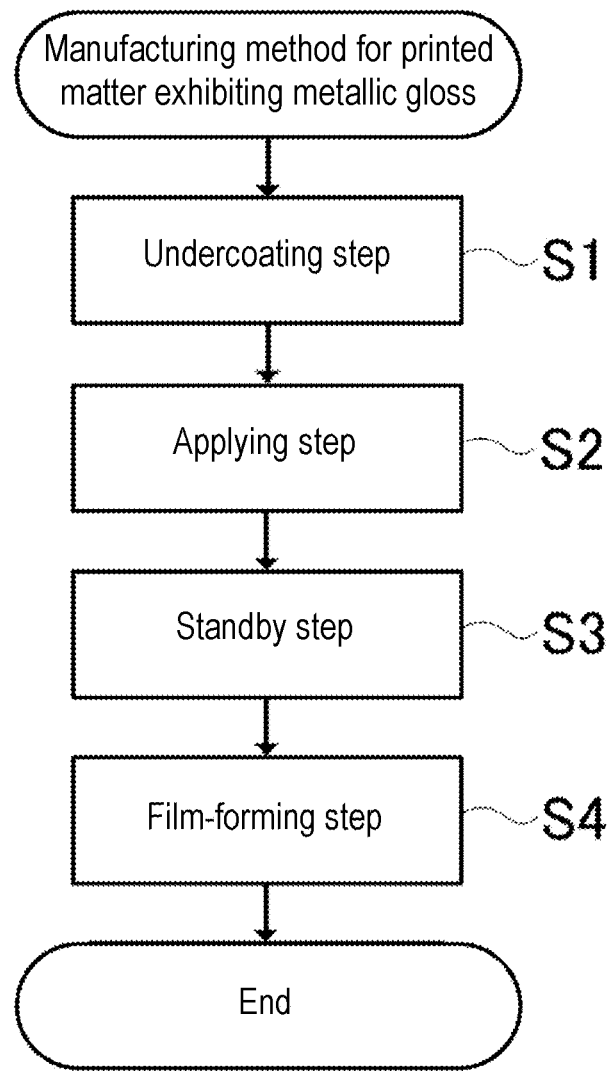
FIG. 1 is a flowchart of a manufacturing method according to a first embodiment of the present disclosure.

A manufacturing method for a printed matter exhibiting a metallic gloss according to a first embodiment of the present disclosure will be described. In the present manufacturing method, as shown in FIG. 1, an undercoating step S1, an applying step S2, a standby step S3, and a film-forming step S4 are mainly performed.

(Substrate)

The substrate to be printed is arbitrary, and for example, a material of the substrate may include: polyethylene terephthalate, vinyl chloride, polyethylene, polypropylene, polycarbonate, acryl, nylon, polystyrene, acrylonitrile butadiene styrene resin, paper, glass, and metal material such as iron, aluminum, stainless steel, and the like. Furthermore, the shape of the substrate is not limited to a planar shape, and may be an arbitrary three-dimensional shape as long as it can be printed with a conventional three-dimensional inkjet printer.

The surface (hereinafter referred to as the surface to be printed) of a portion of the substrate scheduled to be performed with printing (application of glossy ink composition described later) preferably has a surface tension larger than that of the glossy ink composition, so that the glossy ink composition, described later, wet-spreads. However, in the present embodiment, an undercoating layer for promoting the wet-spreading of the glossy ink composition is formed in the undercoating step S1, and hence the surface tension of the surface to be printed is also arbitrary.

If the surface to be printed has a surface tension large enough for the glossy ink composition to wet-spread thereon, the undercoating step S1 may be omitted.

(Inkjet Printer)

In the undercoating step S1 and the applying step S2, an arbitrary conventional inkjet printer can be used as long as it includes a print head capable of ejecting the undercoating composition and the glossy ink composition described later and is compatible with the substrate described above. In particular, as the standby step S3 and the film-forming step S4, to be described later, can also be efficiently performed, it is preferable to use the inkjet printer according to a fourth embodiment of the present disclosure to be described later.

(Undercoating Step S1)

In the undercoating step S1, for example, an undercoating composition is applied (ejected) and fixed on a substrate to be printed, so as to form an undercoating layer (base layer) using an inkjet printer.

The undercoating composition may be applied over the entire surface of the substrate, but the undercoating composition can be applied to the substrate in any shape as long as it covers at least the surface to be printed to be described later. The base layer may be prevented from protruding (this has better appearance) by coinciding the base layer and the metallic glossy layer, described later, in the same shape in plan view (when viewed from the normal direction of the surface of the substrate).

(Undercoating Composition)

The undercoating composition is an ink containing at least an external stimulus film-forming resin (resin that forms a film by an external stimulus; described in detail later) contained in the glossy ink composition to be applied in the applying step S2.

In the undercoating composition, the external stimulus film-forming resin may be dissolved or dispersed in a solvent. Water, aqueous solvent, organic solvent and the like are preferable for the solvent. Specific examples of the aqueous solvent include, for example, polyhydric alcohols, polyhydric alcohol alkyl ethers, polyhydric alcohol aryl ethers, nitrogen-containing heterocyclic compounds, amides, amines, sulfur-containing compounds, propylene carbonate, ethylene carbonate, trimethylolpropane, tetramethylurea and urea. Among these, the polyhydric alcohols include ethylene glycol, diethylene glycol, triethylene glycol, propylene glycol, dipropylene glycol, tripropylene glycol, tetraethylene glycol, polyethylene glycol, polypropylene glycol, 1,3-butanediol, 3-methyl 1,3-butanediol, 2,3-butanediol, 1,4-butanediol, 1,5-pentanediol, 1,6-hexanediol, glycerol, 1,2,6-hexanetriol, 1,2 4-butanetriol, 1,2,3-butanetriol, 2-methyl-2,4-pentanediol, petriol, 3-methoxy-3- methyl-1-butanediol and the like. The polyhydric alcohol alkyl ethers include ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, propylene glycol monoethyl ether and the like. The polyhydric alcohol aryl ethers include polyhydric alcohol aryl ether such as ethylene glycol monophenyl ether, ethylene glycol monobenzyl ether, dipropylene glycol monobutyl ether, tripropylene glycol monobutyl ether, diethylene glycol isobutyl ether, triethylene glycol isobutyl ether, diethylene glycol isopropyl ether and the like. The nitrogen-containing heterocyclic compounds include 2-pyrrolidone, N-methyl-2-pyrrolidone, N-hydroxyethyl-2-pyrrolidone, 1,3-dimethylimidazolidinone, ε-caprolactam, γ-butyrolactone and the like. The amides include formamide, N-methylformamide, N, N-dimethylformamide and the like. The amines include monoethanolamine, diethanolamine, triethanolamine, monoethylamine, diethylamine, triethylamine and the like. The sulfur-containing compounds include dimethyl sulfoxide, sulfolane, thiodiethanol, thiodiglycol and the like. Among these hydrophilic solvents, particularly glycerin, ethylene glycol, diethylene glycol, triethylene glycol, propylene glycol, dipropylene glycol, tripropylene glycol, 1,3-butanediol, 2,3-butanediol, 1,4-butanediol 1,5-pentanediol, tetraethylene glycol, 1,6-hexanediol, 2-methyl-2,4-pentanediol, polyethylene glycol, 1,2,4-butanetriol, 1,2,6-hexanetriol, thiodiglycol, 2-pyrrolidone, N-methyl-2-pyrrolidone, N-hydroxyesyl-2-pyrrolidone, and 1,3-dimethyl-2-imidazolidinone are more preferable. These hydrophilic solvents excel in solubility and excel in prevention of injection characteristics failure due to water evaporation. The solvents mentioned above can be used alone or in combination of two or more. Moreover, the organic solvents include ketones, alcohols, ethers, hydrocarbons, glycols, glycol ether acetates, glycol ethers, esters, pyrrolidones and the like. Among them, the ketones include, for example, acetone, methyl ethyl ketone, cyclohexanone, 2-heptanone and the like. The alcohols include, for example, methanol, ethanol, isopropanol, n-hexyl alcohol, isoheptyl alcohol, 2-ethylhexyl alcohol, n-octyl alcohol, 3-methyl-3-methoxybutanol, 3-methoxybutanol and the like. The ethers include, for example, cellosolve, butyl cellosolve and the like. The hydrocarbons include, for example, toluene, xylene, turpentine oil, limonene, industrial volatile oil, tetrahydronaphthalene, decahydronaphthalene and the like. The glycols include, for example, ethylene glycol, diethylene glycol, thiodiethylene glycol, triethylene glycol, propylene glycol, dipropylene glycol, tripropylene glycol and the like. The glycol ether acetates include, for example, ethylene glycol monoethyl ether acetate, ethylene glycol monobutyl ether acetate, diethylene glycol monoethyl ether acetate, diethylene glycol monobutyl ether acetate and the like. The glycol ethers include, for example, ethylene glycol monohexyl ether, ethylene glycol 2-ethylhexyl ether, ethylene glycol phenyl ether, propylene glycol monoethyl ether, propylene glycol propyl ether, propylene glycol monobutyl ether, diethylene glycol monomethyl ether, diethylene glycol monoethyl ether, diethylene glycol monobutyl ether, diethylene glycol hexyl ether, diethylene glycol 2-ethyl hexyl ether, dipropylene glycol monomethyl ether, dipropylene glycol monoethyl ether, dipropylene glycol monobutyl ether, dipropylene glycol propyl ether, triethylene glycol monomethyl ether, triethylene glycol monoethyl ether, triethylene glycol monobutyl ether, tripropylene glycol monomethyl ether, and the like. The esters include, for example, 2,2,4-trimethyl-1,3-pentanediol monoisobutyrate, triethylene glycol di (2-ethyl butyrate), propylene carbonate, ethyl lactate, butyl lactate, methyl acetoacetate, ethyl acetoacetate, dibasic acid ester DBE, 3-methyl-3-methoxybutyl acetate and the like. The pyrrolidones include, for example, N-methyl-2-pyrrolidone. In particular, the aqueous solvent and the organic solvent are preferably volatile solvents which are easy to dry.

As the undercoating composition, the glossy ink composition itself to be applied in the applying step S2 may be used, or the composition in which scaly particles containing metal are removed from the glossy ink composition may be included.

(Fixing of Undercoating Composition)

As a device for fixing the undercoating composition applied on the substrate, film formation (described in detail later) using an external stimulus given in the film-forming step S4 is preferably used. This is economical as no additional equipment is required. Any fixing method may be adopted according to the material of the undercoating composition.

(Summary of Undercoating Step S1)

Therefore, in the undercoating step S1, the undercoating layer mainly formed of an external stimulus curable resin is formed on the substrate. Generally, solids have higher surface tension than liquids if they are the same material. Therefore, the droplets of the glossy ink composition (liquid) mainly composed of the external stimulus curable resin, which is applied in the applying step S2 described later, are wet-spread on the layer of the undercoating layer (solid) mainly composed of the external stimulus curable resin.

(Applying Step S2)

In the applying step S2, the glossy ink composition is applied in a predetermined shape on the substrate to be printed using an inkjet printer.

(Glossy Ink Composition)

The glossy ink composition is an ink composition that forms a film by an external stimulus, and includes an external stimulus film-forming resin that forms a film by an external stimulus, and scaly particles of aluminum.

In the glossy ink composition, the principle of forming a film by an external stimulus is not particularly limited, but a film-forming system (hereinafter referred to as radiation film-forming system) in which a radiation curable resin mixed in the ink is cured by radiation to form a cured film and a film-forming system (hereinafter referred to as thermal film-forming system) in which the resin mixed in the ink is formed into a film by evaporating a volatile component in the ink by heating are preferably used.

When the radiation film-forming system is adopted, the glossy ink composition contains a radiation curable resin (ultraviolet curable resin, electron beam curable resin, visible light curable resin, infrared curable resin, etc.) which is cured by radiation as an external stimulus film-forming resin. The radiation curable resin may be a monomer, an oligomer, or a polymer, and is preferably an ultraviolet curable resin such as an acrylate radical polymerizable resin or an epoxy cationic polymerizable resin, and in particular, an epoxy modified acrylate, a urethane modified acrylate, a silicone modified acrylate, and the like are preferred.

For example, when the ultraviolet curing system is adopted, the radiation curable resin includes resin such as a monomer or an oligomer that polymerizes by receiving irradiation of ultraviolet light, in particular, an acrylate. As the acrylate, those having low viscosity are preferable from the viewpoint of being ejected through an inkjet method, and include low viscosity acrylic monomers, acrylic oligomers and the like, The low viscosity acrylic monomers include, for example, methoxy polyethylene glycol (n=3 or 9) acrylate, phenoxy ethylene glycol acrylate, phenoxy diethylene glycol acrylate, phenoxy hexaethylene glycol acrylate, methoxy polyethylene glycol (n=2, 4 or 9) methacrylate, 3-chloro-2-hydroxypropyl methacrylate, β-carboxyethyl acrylate, acryloyl morpholine, diacetone acrylamide, vinyl formamide, N-vinyl pyrrolidone, neopentyl glycol dimethacrylate, 2PO neopentyl glycol dimethacrylate, polyethylene glycol (n=4 or 9) diacrylate, ethylene glycol dimethacrylate, nano ethylene glycol diamethacrylate, polypropylene glycol (n=2, 4 or 9) diacrylate, tetraethylene glycol diacrylate, glycerin dimethacrylate, glycerin acrylate methacrylate, modified epoxidized polyethylene glycol diacrylate, acrylic acid 2-(2-vinyloxyethoxy) ethyl, ethoxylated trimethylolpropane triacrylate, ethoxylated glycerin triacrylate (EO 20 mol), EO-modified trimethylolpropane triacrylate or the like. The acrylic oligomers include, for example, hyperbranched polyester acrylates, polyester acrylates, urethane acrylates, epoxy acrylates or the like.

When the ultraviolet curing system is adopted, the glossy ink composition preferably further contains a polymerization initiator. The polymerization initiator is not particularly limited as long as the curing of the polymerizable compound can be initiated by irradiation of the ultraviolet light. The polymerization initiator includes, for example, acyl phosphine oxide type photopolymerization initiators such as (2,4,6-trimethylbenzoyl)-diphenyl-phosphine oxide, bis (2,6-dimethoxybenzoyl)-(2,4,4-trimethylpentyl)-phosphine oxide, bis (2,4,6-trimethyl benzoyl)-phenyl phosphine oxide, ethoxy-phenyl-(2,4,6-trimethyl benzoyl)-phosphine oxide, a aminoalkylphenone initiator such as 4,4-diaminobenzophenone, 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, Michler's ketone, benzoin propyl ether, benzoin ethyl ether, benzyl dimethyl ketal, 1-(4-isopropylphenyl)-2-hydroxy-2-methylpropan-1-one, 2-hydroxy-2-methyl-1-phenylpropan-1-one, thioxanthone, diethylthioxanthone, 2-isopropyl thioxanthone, 2-chlorothioxanthone, 2-methyl-1-[4-(methylthio)phenyl]-2-morpholino-propan-1-one, and the like. These initiators can be used alone or in combination of two or more.

Furthermore, the glossy ink composition may also contain other components in addition to the radiation curable resin and the polymerization initiator. For example, other components include sensitizers, colorants (pigments, dyes, etc.), bearing agents, antifungal agents and the like.

The radiation curable resin may also be dissolved or dispersed in a solvent in the glossy ink composition. The viscosity can be easily made to a range preferable for printing by the inkjet method by dissolving or dispersing the radiation curable resin in the solvent. Water, aqueous solvent, organic solvent and the like are preferable for the solvent. Specific examples of such solvents include the solvents described in the section of the undercoating composition described above. In particular, the aqueous solvent and the organic solvent are preferably non-volatile solvents that do not substantially evaporate in the standby step S3.

When the thermal film-forming system is adopted, the glossy ink composition contains, in addition to the scaly particles of aluminum, a solvent and an external stimulus film-forming resin dissolved or dispersed in the solvent. The external stimulus film-forming resin is optional as long as it is a resin that forms a film on the surface to be printed after the solvent is evaporated from the printed glossy ink composition on the surface to be printed by heating.

When the thermal film-forming system is adopted, examples of the external stimulus film-forming resin include, for example, a thermosetting resin and a thermoplastic resin. The thermosetting resin includes phenol resin, urea resin, melamine resin, alkyd resin, unsaturated polyester resin, epoxy resin, polyurethane resin, diallyl phthalate resin, silicone resin and the like. The thermoplastic resin includes polyethylene resin, vinyl chloride resin, polypropylene resin, polystyrene resin, ABS resin, polyamide resin, fluorine resin and the like. When the thermal film-forming system is adopted, an external stimulus film-forming resin may be mixed in the form of a resin emulsion, and such resins include rosin resins, petroleum resins, terpene resins, epoxy resins, phenol resins, ketone resins and other non-aqueous resins.

When the thermal film-forming system is adopted, the volatile solvent is arbitrary as long as it can be heated and evaporated in the film-forming step S4, and in particular, that in which the natural evaporation amount in the standby step S3 is small to an extent film formation in a non-heated state does not occur is preferable.

More specifically, the thermal film-forming ink includes, for example, solvent ink, latex ink, aqueous ink and the like.

In the solvent ink, an organic solvent is used as a solvent. Examples of the organic solvent include, for example, glycol monoacetates, glycols, glycol ethers, lactic acid esters, and γ-butyrolactone. The glycol monoacetates include ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, dipropylene glycol dimethyl ether, propylene glycol monopropyl ether ethylene glycol monomethyl ether propionate, ethylene glycol monoethyl ether propionate, ethylene glycol monobutyl ether propionate, diethylene glycol monomethyl ether propionate, diethylene glycol monoethyl ether propionate, diethylene glycol monobutyl ether propionate, propylene glycol monomethyl ether propionate, dipropylene glycol monomethyl ether propionate, ethylene glycol monomethyl ether butyrate, ethylene glycol monoethyl ether butyrate, ethylene glycol monobutyl ether butyrate, diethylene glycol monomethyl ether butyrate, diethylene glycol monoethyl ether butyrate, diethylene glycol monobutyl ether butyrate, propylene glycol monomethyl ether butyrate, dipropylene glycol monomethyl ether butyrate and the like. The glycol diacetates include ethylene glycol diacetate, diethylene glycol diacetate, propylene glycol diacetate, dipropylene glycol diacetate, ethylene glycol acetate propionate, ethylene glycol acetate butyrate, ethylene glycol propionate butyrate, ethylene glycol dipropionate, ethylene glycol acetate dibutyrate, diethylene glycol acetate propionate, diethylene glycol acetate butyrate, diethylene glycol propionate butyrate, diethylene glycol dipropionate, diethylene glycol acetate dibutyrate, propylene glycol acetate propionate, propylene glycol acetate butyrate, propylene glycol propionate butyrate, propylene glycol dipropionate, propylene glycol acetate dibutylate, dipropylene glycol acetate propionate, dipropylene glycol acetate butyrate, dipropylene glycol propionate butyrate, dipropylene glycol dipro propionate, dipropylene glycol acetate dibutyrate and the like. The glycols include ethylene glycol, diethylene glycol, triethylene glycol, propylene glycol, dipropylene glycol and the like. The glycol ethers include ethylene glycol monobutyl ether, propylene glycol monomethyl ether, propylene glycol monobutyl ether, diethylene glycol monoethyl ether, diethylene glycol monobutyl ether, dipropylene glycol monomethyl ether, dipropylene glycol monoethyl ether, dipropylene glycol monobutyl ether, tri ethylene glycol monomethyl ether, triethylene glycol monoethyl ether, triethylene glycol monobutyl ether, tripropylene glycol monomethyl ether and the like. The lactic acid esters include methyl lactate, ethyl lactate, propyl lactate butyl lactate and the like. The amount of the solvent contained in the glossy ink composition is preferably greater than or equal to 60% by weight and less than or equal to 95% by weight, more preferably greater than or equal to 70% by weight and less than or equal to 95% by weight, and further more preferably greater than or equal to 80% by weight and less than or equal to 95% by weight with respect to the total amount of the glossy ink composition. Preferably, the glossy ink composition does not contain water. As the glossy ink composition does not contain water, the stability of dispersion of the pigment can be improved, hydrolysis of the solvent can be suppressed, and corrosion of the head can be suppressed. The content of water in the glossy ink composition is more preferably less than or equal to 0.5% by weight, which is a normal moisture absorption amount. In the case of the solvent ink, the external stimulus film-forming resin includes, for example, acrylic resin, styrene-acrylic resin, styrene-maleic acid resin, rosin resin, rosin ester resin, ethylene-vinyl acetate resin, petroleum resin, coumarone indene resin, terpene phenol resin, phenol resin, urethane resin, melamine resin, urea resin, epoxy resin, cellulose resin, salt vinyl acetate resin, xylene resin, alkyd resin, aliphatic hydrocarbon resin, butyral resin, maleic acid resin, fumaric acid resin and the like. These may be used alone or in combination of two or more.

Latex ink refers to an ink in which an external stimulus film-forming resin, which is a binder resin, is dispersed, emulsified or suspended in a solvent. Specific examples of the solvent include those containing water or a mixture of water and a water-soluble organic solvent. Here, the water-soluble organic solvent includes glycerin, trimethylolpropane, ethylene glycol, diethylene glycol, triethylene glycol, propylene glycol, dipropylene glycol, tripropylene glycol, 1,3-butanediol, 2,3-butanediol, 1, 4-butanediol, 3-methyl-1, 3-butanediol, 1,5-pentanediol, 1,6-hexanediol, 2-methyl-2, 4-hexanediol, 2-pyrrolidone, N-methyl-2-pyrrolidone, N-hydroxyethyl-2-pyrrolidone, tetramethylurea, urea and the like. In a case of an aqueous latex ink in which the external stimulus film-forming resin is emulsified or suspended in a solvent, it can be said that an aqueous emulsion or aqueous suspension is formed by the external stimulus film-forming resin. In a case of a latex ink, examples of the binder resin serving as the external stimulus film-forming resin include water-soluble vinyl resins, acrylic resins, alkyd resins, polyester resins, polyurethane resins, silicone resins, fluorine resins, epoxy resins, phenoxy resins, polyolefin resins and the like as well as modified resins and the like thereof. Among these, an acrylic resin, a water-soluble polyurethane resin, a water-soluble polyester resin, and a water-soluble acrylic resin are more preferably used, and an acrylic resin is preferably used in particular. The binder resin contained in the latex ink may be used alone or in combination of two or more. In a case of the latex ink, the compounding amount of the external stimulus film-forming resin in the glossy ink composition can be arbitrarily determined according to the type of resin used and the like, but for example, is greater than or equal to 10% by weight, preferably greater than or equal to 2% by weight, and is less than or equal to 20% by weight and more preferably less than or equal to 15% by weight with respect to the total amount of the glossy ink composition. Furthermore, in the case of the latex ink, the glossy ink composition may contain an emulsifier for dispersing, emulsifying, or suspending the external stimulus film-forming resin. In addition, the solvent in the latex ink may include, in addition to the dispersed, emulsified, or suspended external stimulus film-forming resin, another resin dissolved in the solvent. Another resin may be dissolved in the solvent, for example, to adjust the viscosity of the ink. In addition, when moisture is released by drying, in a case in which a skin is formed by bonding of the emulsified or suspended resins, the other resin is used as a binder so as to have a function of more strongly binding the emulsified or suspended external stimulus film-forming resins.

In the aqueous ink, water or a hydrophilic solvent other than water is used as the solvent, and among them, water is more preferable. It is easy to handle and easy to remove by drying. In the case of an aqueous ink system, the content of the solvent contained in the glossy ink composition can be appropriately selected, and for example, is preferably greater than or equal to 50% by weight and more preferably greater than or equal to 60% by weight, and preferably less than or equal to 90% by weight and most preferably less than or equal to 80% by weight with respect to the total amount of the glossy ink composition. Examples of hydrophilic solvents other than water include those containing water and a water-soluble organic solvent, but the water-soluble organic solvent mentioned in the above-mentioned latex ink can be used as the water-soluble organic solvent. Furthermore, other components can be added to the aqueous ink composition as necessary. Other components include, for example, additives such as a diluent, a viscosity modifier, a surface tension regulator, and the like. In the case of the aqueous ink system, the external stimulus film-forming resin contains at least one resin selected from a thermoplastic resin and a thermosetting resin, and the resin is preferably dissolved or dispersed. The type of resin includes, for example, water-soluble vinyl resin, acrylic resin, alkyd resin, polyester resin, polyurethane resin, silicone resin, fluorine resin, epoxy resin, phenoxy resin, polyolefin resin, Nylon (registered trademark), vinylon, acetate, polylactic acid and the like, and modified resins thereof and the like. Among these, acrylic resin, water-soluble polyurethane resin, water-soluble polyester resin, and water-soluble acrylic resins are more preferably used. In the case of an aqueous ink, the content of the resin contained in the glossy ink composition can be appropriately selected, and for example, is preferably greater than or equal to 10% by weight and more preferably greater than or equal to 2% by weight, and preferably less than or equal to 20% by weight and most preferably less than or equal to 10% by weight with respect to the total amount of the aqueous ink composition.

The scaly particles of aluminum have a shape in which the area observed (plan view) from a predetermined angle is larger than the area observed from an angle orthogonal to the observation direction, and in particular, a ratio ($S1/S0$) of the area $S1$ [$\mu m^2$] observed (plan view) from the direction in which a projection area becomes a maximum and the area $S0$ [$\mu m^2$] observed from the direction in which the area when observed becomes a maximum of the directions orthogonal to the observation direction is preferably greater than or equal to two, more preferably greater than or equal to five, and particularly preferably greater than or equal to eight. As this value, for example, ten randomly extracted particles may be observed, and an average value of values calculated for these particles may be adopted.

The scaly particles preferably have an average particle diameter of 0.01 µm to 2 µm, and more preferably 0.1 µm to 1.5 µm. The scaly particles preferably have an average thickness of 10 nm to 200 nm, and more preferably 20 nm to 100 nm. When the average particle diameter and the average thickness of the scaly particles are in the above-mentioned range, an image excelling in the smoothness of the coating film and the metal glossiness can be recorded. Furthermore, while being able to manufacture a pigment dispersing liquid with sufficient productivity, the unintended deformation of the scaly particles at the time of manufacturing ink composition can also be prevented.

The average particle diameter is represented by the 50% average particle diameter (R50) of the equivalent circle diameter obtained from the area of the projected image of the scaly particles obtained by the particle image analyzer. The "equivalent circle diameter" is the diameter of the circle when it is assumed as a circle having the same area as the area of the projected image of the scaly particles obtained using the particle image analyzer. For example, when the projected image of the scaly particles is a polygon, the diameter of the circle obtained by converting the projected image into a circle is referred to as the equivalent circle diameter of the scaly particles.

The area and the equivalent circle diameter of the projected image of scaly particles can be measured using the particle image analyzer. Examples of such particle image analyzer include, for example, flow type particle image analyzers FPIA-2100, FPIA-3000, and FPIA-3000S (all manufactured by Sysmex Corporation) and the like. The average particle diameter of the equivalent circle diameter is a particle diameter on a number basis. Furthermore, as a measurement method in the case of using the FPIA-3000 or 3000S, a method of measuring in the HPF measurement mode using a high magnification imaging unit is mentioned as an example.

In addition, an average thickness is obtained by projecting a side surface image of the scaly particle using a transmission electron microscope (TEM) or a scanning electron microscope (SEM), obtaining each thickness of the ten scaly particles, and averaging such thicknesses. Examples of the transmission electron microscopes (TEM) include model "JEM-2000EX" manufactured by Nippon Denshi Co., Ltd., and examples of the scanning electron microscopes include model "S-4700" manufactured by Hitachi High-Technologies Corporation and the like.

The content of the scaly particles of aluminum is preferably greater than or equal to 0.10% by weight and less than or equal to 10.0% by weight, and more preferably greater than or equal to 1.0% by weight and less than or equal to 7.0% by weight with respect to the total amount (100% by weight) of the glossy ink composition. This may improve the metal glossiness.

Furthermore, the scaly particles of aluminum may be coated with a coating film in order to suppress corrosion and the like. Such a coating film is preferably a film containing an inorganic oxide formed using an alkoxysilane having a silicon atom in the structure (e.g., tetraethoxysilane), polysilazane or the like, or a film obtained using a fluorine-based compound (e.g., fluorine phosphonic acid, fluorine carboxylic acid, fluorine sulfonic acid, and salts thereof).

The method for producing the coating film is not particularly limited, but the description in, for example, US Patent Application Publication No. 2010/0256284, and US Patent Application Publication No. 2010/0256283 can be used.

Furthermore, the scaly particles of aluminum may be coated with a leafing agent. Such leafing agents include stearic acid, oleic acid and the like.

(Summary of Applying Step S2)

Figure 2A:
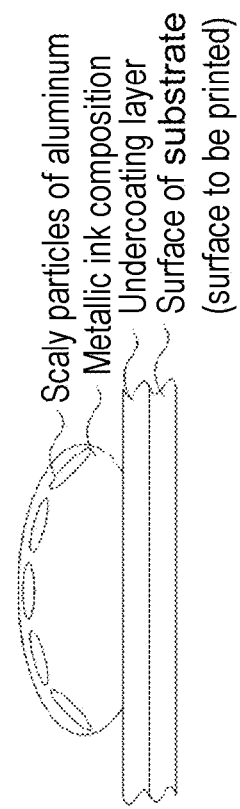
FIGS. 2A to 2D are schematic cross-sectional views showing a state of the glossy ink composition on the substrate in each step of the manufacturing method according to the first embodiment of the present disclosure.

The glossy ink composition immediately after being applied on the surface to be printed by way of the undercoating layer is in the form of droplets as shown in FIG. 2A.

(Standby Step S3)

In the standby step S3, the glossy ink composition applied on the surface to be printed is maintained in a state of maintaining fluidity and left untouched in such a state for a predetermined standby time from immediately after the applying step S2 to immediately before the film-forming step S4.

For this reason, it is preferable not to apply an external stimulus for forming a film from the glossy ink composition applied on the surface to be printed during the standby step S3. For example, during the standby step S3, the surface to be printed is preferably shielded optically, electromagnetically, or thermally depending on the type of external stimulus for forming a film from the glossy ink composition. For example, during the standby step S3, the surface to be printed is preferably placed in a dark room (in the case of optical shielding), an anechoic chamber (in the case of electromagnetic shielding) or a thermal insulation chamber (in the case of thermal shielding). These shielding chambers are preferably incorporated in the inkjet printer.

However, an external stimulus may be applied to the surface to be printed as long as it is within a range the glossy ink composition on the surface to be printed can maintain fluidity during the standby step S3. For example, during the standby step S3, the surface to be printed may be placed under fluorescent lighting or room temperature (25° C.).

When the glossy ink composition is left on the surface to be printed while maintaining the fluidity, as described above, the following (1) and (2) are assumed to occur according to the standby time.

Figure 2B:
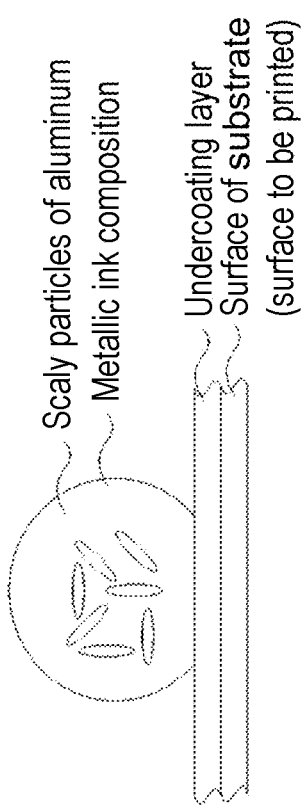

(1) At a relatively early stage of the standby time (or when the standby time is relatively short), the droplets of the glossy ink composition maintain a relatively spherical shape while wet-spreading, as shown in FIG. 2B. In the droplet, scaly particles of aluminum approach the surface of the droplet and are oriented substantially parallel to the surface along the surface. This is presumed to be the result of the aluminum scaly particles gathering at the surface of the droplet by leafing, buoyancy and the like. Further, even when the density of the droplets of the glossy ink composition on the surface to be printed is high, the adjacent droplets come into contact with each other but do not merge together, and form a layer having irregularities, as shown in FIG. 8B. The scaly particles of aluminum are reduced so that the orientation described above is quickly carried out.

Figure 2C:
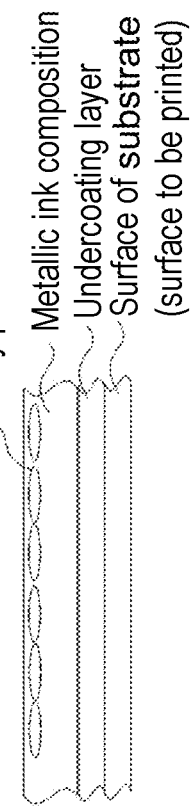
Figure 2D:
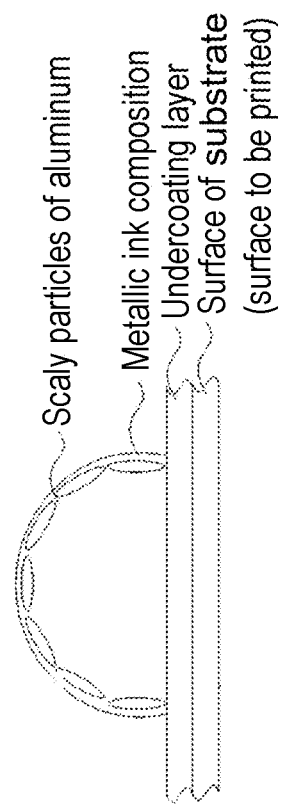

(2) At a relatively late stage of the standby time (or when the standby time is relatively long), the droplets of the glossy ink composition are further wet-spreading, as shown in FIG. 2C in a state the orientation is finished. In this process, the plurality of aluminum scaly particles in the droplet are oriented to be substantially parallel to the surface in a vicinity of the surface of the glossy ink composition after being wet-spread as a result of being compressed as a whole in a direction perpendicular to the surface to be printed while maintaining the orientation formed in (1). Furthermore, if the density of the droplets of the glossy ink composition on the surface to be printed is sufficient, the wet-spread droplets merge with the adjacent droplets, and first form a layer having protrusions and flat parts, as shown in FIG. 8C, and ultimately become a substantially flat layer, as shown in FIG. 8D. Thus, in the glossy ink composition that became a substantially flat layer on the surface to be printed, as shown in FIG. 2D, the scaly particles of aluminum are oriented substantially parallel to the surface of the flat layer in a more uniformed state.

In summary, according to the standby time, first, (1) in the droplets of the glossy ink composition on the surface to be printed, the aluminum scaly particles are oriented substantially parallel to the surface of the droplets (wet-spreading also advances in parallel to a certain degree), and next, (2) the droplet of the glossy ink composition is wet-spread on the surface to be printed while maintaining such orientation, thus forming a flat layer.

(Film-Forming Step S4)

In the film-forming step S4, an external stimulus for forming a film from the external stimulus film-forming resin is applied to the glossy ink composition on the surface to be printed in which the scaly particles of aluminum are oriented along the surface in the standby step S3 to form a layer, so that a metallic glossy layer including the cured glossy ink composition is obtained. Thus, in the metallic glossy layer, the shape of the glossy ink composition and the orientation of the aluminum scaly particles as shown in FIGS. 2B to 2D and FIGS. 8B to 8D are assumed to be maintained permanently.

A means for applying an external stimulus is arbitrary as long as it can form a film from the glossy ink composition, and any radiation irradiating device (when a radiation film-forming system is adopted for the glossy ink composition. Specifically, an ultraviolet irradiating device (when the external stimulus film-forming resin is an ultraviolet curable resin), an electron beam irradiating device, a visible light irradiating device, an infrared irradiating device, etc.) or any heating device (when a thermal film-forming system is adopted for the glossy ink composition). Specifically, a heater, a radiation heater, etc. can be used. These devices are preferably incorporated in the inkjet printer.

SUMMARY

As shown in FIG. 2B, when the droplets of the glossy ink composition are maintaining a relatively spherical shape, or as shown in FIG. 8B, or when a layer of the glossy ink composition having irregularities is being formed, the surface of the metallic glossy layer appears rough, in other words, exhibits a matte texture.

As shown in FIG. 2C, when the droplet of the glossy ink composition is wet-spread, and as shown in FIG. 8C, when a layer having a protrusion and a flat part is formed, the surface of the metallic glossy layer is flatter than the layer having irregularities described above but is still rough.

On the other hand, as shown in FIGS. 2D and 8D, when a substantially flat layer is formed, the surface of the metallic glossy layer appears smooth even in visual observation and is a mirror surface.

When the surface to be printed is wide, if attempt is made to apply the glossy ink composition to the entire region of the surface to be printed in one applying step S2, this takes time, and hence the droplets of the glossy ink composition applied first tends to dry up and the fluidity of the droplets may be impaired before proceeding to the standby step S3. In this case, the surface to be printed is divided into small regions of an extent the drying of the droplets of the glossy ink composition does not pose a problem, and the glossy ink composition is applied to any of the small regions in one applying step S2, and the standby step S3 to the film-forming step S4 are preferably repeated for each applying step S2.

According to the manufacturing method described above, a printed matter exhibiting gloss of different texture can be manufactured by changing the standby time in the standby step S3.

(Effect of First Embodiment)

Conventionally, when applying a metallic gloss to a printing target by printing, the texture of the gloss could only be changed by changing the composition of the ink. However, as described above, according to the manufacturing method for a printed matter exhibiting a metallic gloss according to the first embodiment, the standby time between the application and the curing of the ink is controlled while having the composition of the ink constant, so that the texture of the metallic gloss to be given to the printed matter can be easily adjusted. For example, the surface of the metallic glossy layer becomes smoother (or mirror surface) the longer the standby time, and the surface of the metallic glossy layer becomes rougher (matte) the shorter the standby time. Furthermore, similar metallic glossy layer can be formed with a constant method regardless of the material of the substrate by providing the undercoating layer. Furthermore, since the scaly particles of aluminum are floated in the droplets of the ink composition, the appearance of the metallic glossy layer is improved as the scaly particles of aluminum are located in the vicinity of the surface (position closer to the surface than the back surface) of the metallic glossy layer (when the scaly particles of aluminum are arranged in the vicinity of the back surface of the metallic glossy layer, the metallic glossy layer adversely affects the appearance of the scaly particles of aluminum). Aluminum may be changed to any metal.

First Modified Example

In the first embodiment, the undercoating layer that assists the wet-spreading of the glossy ink is formed on the substrate, but instead, surface processing (primer treatment etc.) that assists the wet-spreading of the glossy ink composition may be applied to the substrate. For example, a treatment for improving water repellency may be performed on the surface to be printed so that the static contact angle of the glossy ink composition on the surface to be printed after the treatment is less than 90°. Such surface treatment is particularly advantageous when the static contact angle of the glossy ink composition on the untreated surface to be printed is greater than or equal to 90°. According to the configuration of the first modified example described above, the undercoating step S1 can be omitted.

Second Modified Example

The droplets are less likely to be wet-spread the smaller the size of the droplets of the glossy ink composition applied by the inkjet printer, and the droplets are easily wet-spread the larger the size. In other words, the size of the droplet of the glossy ink composition and the wet-spreading speed of the droplet on the surface to be printed are in a proportional relationship. Therefore, in the first embodiment, the standby time is preferably adjusted based on the proportional relationship according to the size of the droplet of the glossy ink composition to be applied.

Third Modified Example

In the first embodiment, when the glossy ink composition contains an excessive amount of solvent, an evaporating step is performed between the standby step S3 and the film-forming step S4, and the solvent may be evaporated until the amount of the solvent in the glossy ink composition becomes less than or equal to a desired amount (e.g., to an extent the curing of the glossy ink composition is not inhibited).

The method of evaporating the solvent is optional, and for example, natural drying, air drying, heat drying, radiation drying (ultraviolet light drying, electron beam drying, etc.) can be used.

It is preferable to use a drying method (i.e., radiation drying or heat drying) using an external stimulus applied in the next film-forming step S4. This is economical because no additional device is required, and it is efficient because the evaporating step and the film-forming step S4 can be performed integrally.

In the evaporating step, the thickness of the droplet or the layer of the glossy ink composition on the surface to be printed is reduced, but as shown in FIGS. 3A to 3C, the arrangement of the scaly particles of metal in the droplet or the layer is relatively maintained with respect to the shape of the droplet or the layer. Therefore, even if the thickness of the metallic glossy layer fluctuates by printing, the quality and degree of gloss are maintained.

Second Embodiment

A printed matter 1 that exhibits metallic gloss according to a second embodiment will be described.

Figure 4:
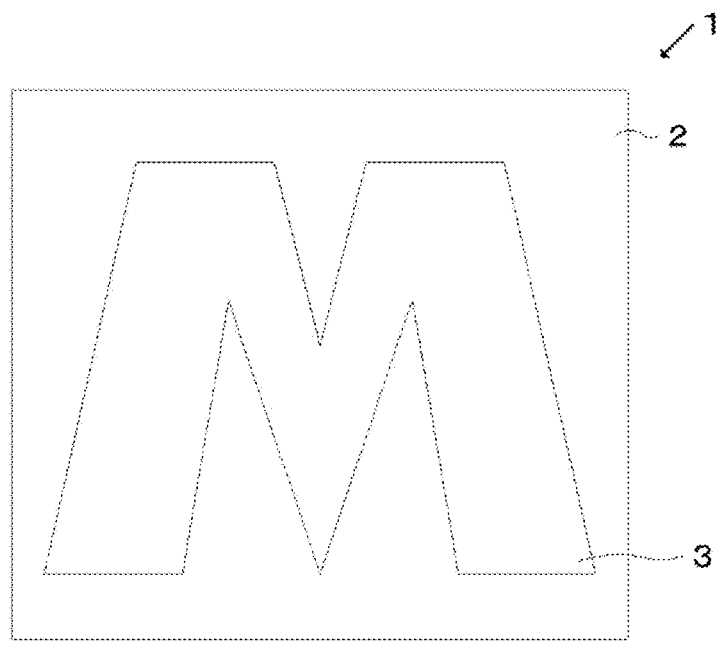
FIG. 4 is a schematic view of a printed matter according to the second and third embodiments of the present disclosure as viewed from the surface to be printed.

As shown in FIG. 4, the present printed matter 1 includes a substrate 2 and a metallic glossy layer 3 printed on the substrate 2 in, for example, an "M" shape.

Similar to the first embodiment, the material and shape of the substrate 2 are arbitrary, and the surface of the substrate 2 may be subjected to surface treatment.

In the metallic glossy layer 3, as shown in FIG. 2D, the scaly particles of aluminum are located on the surface side of the metallic glossy layer 3 and the main surface (surface of large area) is oriented to be substantially parallel to the surface of the substrate in an arbitrary individual (preferably, cured product of glossy ink composition of the first embodiment). Thus, the metallic glossy layer 3 exhibits a metallic gloss like a mirror.

The preferable properties of the metallic glossy layer 3 can be evaluated by the DOI value and the Sa value.

The DOI value is a value indicating image clarity, that is, how clear the image appearing on the measurement surface when measured based on ASTM D5767. This value can be measured, for example, by RHOPOINT-IQ manufactured by Konica Minolta Co., or Micro Haze Plus manufactured by BYK Gardner Co. Regarding such a value, 100% indicates a surface reflecting a completely distortion free image, and the image becomes more difficult to identify as the value approaches 0%.

The Sa value is an average value of the absolute values of the differences in height of each point on the measurement surface with respect to the average surface of the measurement surface, as measured based on ISO 25178. It can be said that as this value becomes smaller, the irregularities of the surface are decreased and the surface is smoother. This value can be measured, for example, by a shape analysis laser microscope manufactured by KEYENCE Co.

When evaluation is performed with the above-mentioned numerical value, the surface of the metallic glossy layer 3 preferably has a DOI value of greater than or equal to 20% and an Sa value of less than or equal to 2 μm. If such a numerical range is satisfied, the metallic glossy layer 3 has the preferable properties described above. Furthermore, the metallic gloss of the metallic glossy layer 3 is further improved by making the DOI value higher and/or the Sa value lower.

(Effect of Second Embodiment)

According to the second embodiment, the metallic glossy layer 3 exhibits metallic gloss due to the suitable orientation of the scaly particles of aluminum in the metallic glossy layer 3.

Furthermore, according to the second embodiment, the degree of metallic gloss can be objectively evaluated by the DOI value and the Sa value, so that quality control can be more accurately performed as compared with the conventional method that relies on evaluation of the metallic gloss by visual observation.

Fourth Modified Example

In the second embodiment, the properties of the metallic glossy layer 3 were evaluated by the DOI value and the Sa value, but evaluation can be made using other parameters such as Rspec value, GLOSS value, Sz value, Vvc value, and coating film thickness.

The Rspec value is a value obtained by measuring peak reflection in a very narrow angle range of regular reflection direction (20°)±0.0991° when light is irradiated at an incident angle of 20°. This value can be measured, for example, by RHOPOINT-IQ manufactured by Konica Minolta Co. It can be said that as this value becomes higher, the regular reflection (specular reflection) occurs. The Rspec value is preferably greater than or equal to 10 GU, in particular greater than or equal to 50 GU.

The GLOSS value is a glossiness measured at an incident light angle of 20° based on ASTM D523/ISO 2813. This value can be measured, for example, by RHOPOINTIQ manufactured by Konica Minolta Co. or Micro Haze Plus manufactured by BYK Gardner Co. It can be said that the higher the value, the gloss of the measurement surface becomes shinier, and the lower the value, the gloss of the measurement surface becomes matte. The GLOSS value is preferably greater than or equal to 100 GU.

The Sz value is a parameter that represents a distance from the highest point to the lowest point of the measurement surface as measured based on ISO 25178. It can be said that as this value becomes smaller, the opening in the irregularities of the surface are lesser and the surface is smoother. This value can be measured, for example, by a shape analysis laser microscope manufactured by KEYENCE Co. The Sz value is preferably less than or equal to 4 μm.

The Vvc value is a parameter that represents a void volume of a space of a core portion present in the measurement surface measured with a load area ratio separating the core portion and the projecting hill portion as 10% and a load area ratio separating the core portion and a projecting valley portion as 80% based on ISO25178. This value can be measured, for example, by a shape analysis laser microscope manufactured by KEYENCE Co. It can be said that as this value becomes larger, the smooth portion increases on the surface. The Vvc value is preferably less than or equal to 4 ml/m$^2$.

Conventionally, when forming a metallic glossy layer by an inkjet printer, as shown in the publication of Japanese Patent No. 5447043, the orientation of aluminum scaly particles is controlled in the droplets of glossy ink applied on a substrate, and the cured droplets having metallic gloss are arranged in plurals to obtain a metallic glossy layer. In the present disclosure, the droplets of the glossy ink composition are merged together into one layer by providing an appropriate standby time in the manufacturing method according to the first embodiment, and then the orientation of the scaly particles of aluminum can be suitably controlled in the one layer. As a result, rather than a metallic glossy layer including a plurality of cured droplets, one metallic glossy layer formed by merging the droplets as shown in FIG. 8D is obtained. If the Vvc value is within the range described above, the metallic glossiness increases as the portion where such one metallic glossy layer is formed increases.

The coating film height is a value indicating the height from the bottom surface to the upper surface of the measurement surface. This value can be measured, for example, by a shape analysis laser microscope manufactured by KEYENCE Co. The coating film thickness is preferably greater than or equal to 3 μm and less than or equal to 30 μm.

Conventionally, in order to align the scaly particles of aluminum in the glossy layer, the coating film thickness had to be about the same as the thickness of the aluminum scaly particles, but in the present disclosure, even when the coating film thickness is thicker than the thickness of the aluminum scaly particles, the aluminum scaly particles can be aligned in the metallic glossy layer 3 by providing an appropriate standby time in the manufacturing method according to the first embodiment. In this case, if the coating film thickness is within the range described above, the aluminum scaly particles are aligned across a plurality of layers in the metallic glossy layer 3, and hence the metallic gloss is increased.

In the fourth modified example, the quality control of the metallic gloss of the printed matter can be performed more accurately than in the past by using the above parameters.

Fifth Modified Example

The manufacturing method for the printed matter according to the first embodiment can be used to obtain the printed matter according to the second embodiment or the printed matter according to the fourth modified example. In this case, as apparent from the results of the second example and Tables 1 and 2 thereof, the parameters listed in the second embodiment and the fourth modified example can be adjusted by varying the standby time of the standby step S3.

Specifically, the standby time is preferably set such that the surface of the metallic glossy layer 3 has at least one of the following physical properties, a) Rspec value is greater than or equal to 10 GU or greater than or equal to 50 GU,
b) Sa value is less than or equal to 2 μm,
c) DOI value is greater than or equal to 20%,
d) GLOSS value is greater than or equal to 100 GU,
e) Sz value is less than or equal to 4 μm,
f) Vvc value less than or equal to 4 ml/m$^2$,
g) Coating film height is greater than or equal to 3 μm and less than or equal to 30 μm.

Third Embodiment

A printed matter exhibiting metallic gloss according to a third embodiment will be described. The printed matter is similar to the printed matter exhibiting the metallic gloss according to the second embodiment except for the configuration of the metallic glossy layer 3. Hereinafter, only the configuration of the metallic glossy layer 3 will be described.

The metallic glossy layer 3 includes an arbitrary individual (preferably, cured product of glossy ink composition of the first embodiment) and includes a plurality of protrusions, where as shown in FIGS. 2B and 2C, the scaly particles of aluminum are oriented in each so that its surface is substantially parallel to the surface of the protrusion in each protrusion. Thus, the metallic glossy layer 3 exhibits a matte metallic gloss.

The preferable properties of the metallic glossy layer 3 can be evaluated by the log HAZE value and the Sdq value.

The HAZE value is a haze (unit: HAZE UNIT (HU)) measured at an incident light angle of 20° based on ASTM E430/ISO 13803. This value can be measured, for example, by RHOPOINT-IQ manufactured by Konica Minolta Co., or Micro Haze Plus manufactured by BYK Gardner Co. The log HAZE value is obtained by log HAZE=1285×log [(HAZE value/20)+1](where, log is a common logarithm). The higher the log HAZE value, the hazier the reflection image on the measurement surface, and the lower the log HAZE value, the higher the contrast of the reflection image on the measurement surface.

The Sdq value is a parameter calculated from the root mean square of the slope at all points on the measurement surface as measured according to ISO 25178. It can be said that as the value becomes smaller, the surface becomes smoother. This value can be measured, for example, by a shape analysis laser microscope manufactured by KEYENCE Co.

When evaluation is made by the numerical value described above, the surface of the metallic glossy layer 3 has a log HAZE value of greater than or equal to 200 and less than or equal to 1400 (preferably greater than or equal to 300 and less than or equal to 900), and an Sdq value of preferably greater than or equal to 0.7 and less than or equal to 2. If such a numerical range is satisfied, the metallic glossy layer 3 has the preferable properties described above. In addition, the metallic gloss of the metallic glossy layer 3 can be made closer to a mirror-like gloss by lowering the log HAZE value in the above described range and/or lowering the Sdq value. Conversely, the metallic gloss of the metallic glossy layer 3 can be made closer to a matte texture by increasing the log HAZE value in the above range and/or increasing the Sdq value.

(Effect of Third Embodiment)

According to the third embodiment, the metallic glossy layer 3 exhibits matte metallic gloss due to the suitable orientation of the scaly particles of aluminum in the metallic glossy layer 3.

Furthermore, according to the third embodiment, as the degree of metallic gloss can be objectively evaluated by the log HAZE value and the Sdq value, the quality control can be more accurately performed as compared with the conventional method that relies on evaluation of the metallic gloss by visual observation.

Sixth Modified Example

In the third embodiment, the properties of the metallic glossy layer 3 are evaluated by the log HAZE value and the Sdq value, but evaluation can be made using other parameters such as GLOSS value, Sdr value, Spc value, and Vvc value.

The definition of the GLOSS value is the same as that of the fourth modified example. In the sixth modified example, the GLOSS value is preferably greater than or equal to 15 GU and less than 100 GU.

The Sdr value is a parameter that represents how much the developed area (surface area) of the measurement surface is increased relative to the area of the measurement surface, as measured based on ISO 25178. It can be said that as the value becomes smaller, the surface becomes smoother. This value can be measured, for example, by a shape analysis laser microscope manufactured by KEYENCE Co. The Sdr value is preferably less than or equal to 2.

The Spc value is a parameter that represents the average of the principal curvatures of the peak points of the measurement surface as measured based on ISO 25178. As the value becomes smaller, the point at which the measurement surface contacts another object becomes rounder, and as the value becomes larger, the point at which the measurement surface contacts another object becomes sharper. This value can be measured, for example, by a shape analysis laser microscope manufactured by KEYENCE Co. The Spc value is preferably greater than or equal to 1000 $mm^{-1}$ and less than or equal to 2200 $mm^{-1}$.

The definition of the Vvc value is the same as that of the fourth modified example. In the fifth modified example, the Vvc value is preferably greater than or equal to 1.5 $ml/m^2$ and less than or equal to 5.8 $ml/m^2$.

In the sixth modified example, the quality control of the metallic gloss of the printed matter can be performed more accurately by using the above parameters.

Seventh Modified Example

The manufacturing method for the printed matter according to the first embodiment can be used to obtain the printed matter according to the third embodiment or the printed matter according to the sixth modified example. In this case, as apparent from the results of the second example and Tables 1 and 2 thereof, the parameters listed in the third embodiment and the sixth modified example can be adjusted by varying the standby time of the standby step S3.

Specifically, the standby time is preferably set such that the surface of the metallic glossy layer 3 has at least one of the following physical properties, a) Log HAZE value is greater than or equal to 200 and less than or equal to 1400 or greater than or equal to 300 and less than or equal to 900, b) Sdq value is greater than or equal to 0.7 and less than or equal to 2, c) GLOSS value is greater than or equal to 15 GU and less than 100 GU, d) Sdr value is less than or equal to 2, e) Spc value is greater than or equal to 1000 $mm^{-1}$ and less than or equal to 2200 $mm^{-1}$, f) Vvc value is greater than or equal to 1.5 $ml/m^2$ and less than or equal to 5.8 $ml/m^2$.

Eighth Modified Example

In the printed matter 1 according to the second and third embodiments as well as the fourth and sixth modified examples, a flat layer having the same composition as that of the metallic glossy layer 3 may be formed as the surface treatment on the surface to be printed of the substrate 2. Such printed matter 1 can be economically and efficiently manufactured by the manufacturing method according to the first modified example.

Fourth Embodiment

An inkjet printer 10 according to a fourth embodiment of the present disclosure will be described. According to the inkjet printer 10, the manufacturing method according to the first embodiment can be suitably performed to manufacture the printed matter 1 in which the metallic glossy layer 3 is formed on the substrate 2, as shown in FIG. 4.

(Configuration of Inkjet Printer 10)

Figure 5:
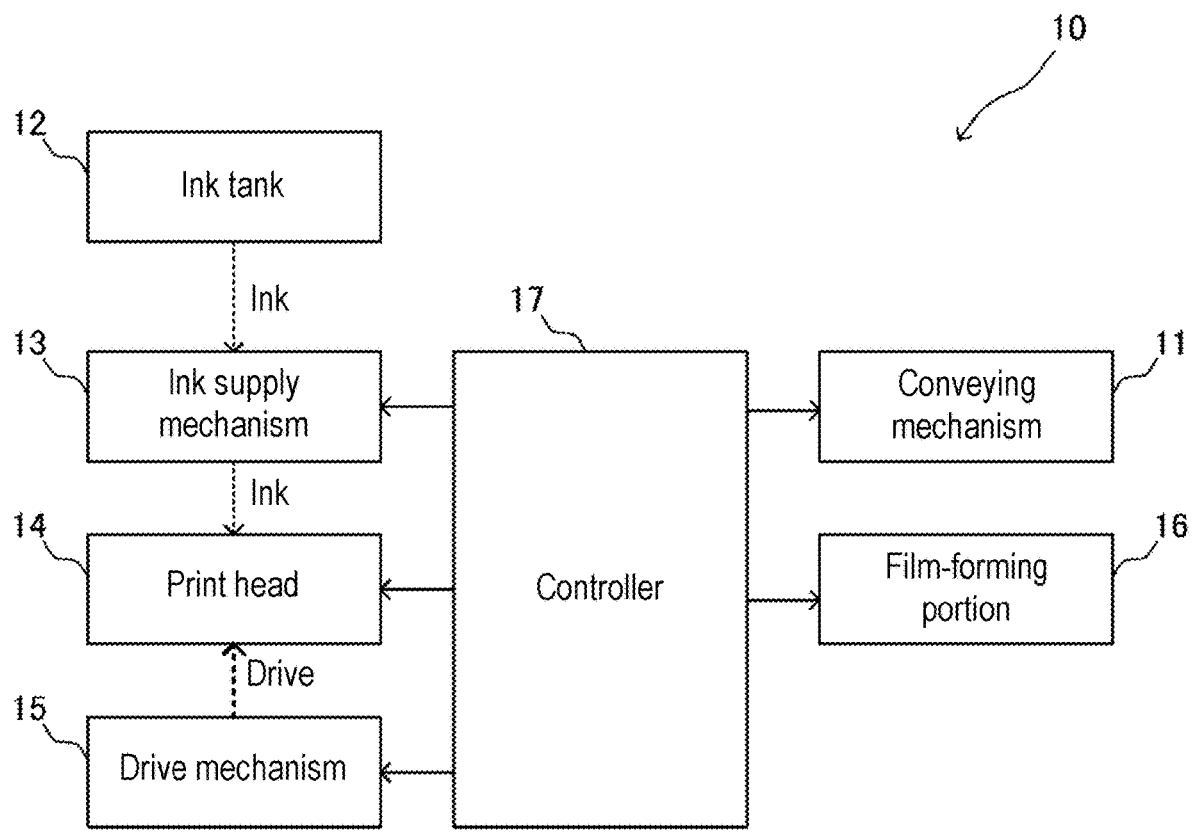
FIG. 5 is a configuration view of an inkjet printer according to a fourth embodiment of the present disclosure.

As shown in FIG. 5, the inkjet printer 10 includes a conveying mechanism 11, an ink tank 12, an ink supply mechanism 13, a print head 14, a drive mechanism 15, a film-forming portion 16, and a controller (control portion) 17.

The conveying mechanism 11 conveys the substrate 2. The conveying mechanism 11 is configured by a belt conveyor. The conveying mechanism 11 may include a table on which the substrate 2 is placed and a drive mechanism that drives the table.

The ink tank 12 is an ink cartridge storing a glossy ink composition similar to that described in the first embodiment, and is attached to the inkjet printer 10.

The ink supply mechanism 13 is a mechanism that supplies the glossy ink composition in the ink tank 12 to the print head 14. The ink supply mechanism 13 includes a sub tank that stores the glossy ink composition, a supply pipe that supplies the glossy ink composition in the ink tank 12 to the sub tank, a circulation tube that forms a circulation path for circulating the glossy ink composition stored in the sub tank through the print head 14, a valve that controls the circulation of the glossy ink composition in the circulation path, and a driving device that drives the valve.

The print head 14 ejects the glossy ink composition supplied from the ink supply mechanism 13 by an inkjet method, and applies it to the substrate 2. The print head 14 includes a storage chamber that stores the ink circulating in the circulation path of the ink supply mechanism 13, a piezoelectric element or heater that pushes out the glossy ink composition stored in the storage chamber, and a nozzle that ejects the pushed out glossy ink composition. A plurality of sets of storage chambers, piezoelectric elements or heaters, and nozzles may be arranged along the main scanning direction described later. As a result, the glossy ink composition can be ejected simultaneously for a plurality of pixels aligned along the main scanning direction.

The drive mechanism 15 moves the print head 14 in a direction orthogonal to the conveyance direction (main scanning direction) of the substrate 2. The drive mechanism 15 includes a carriage 15a for mounting the print head 14 and a moving mechanism for moving the carriage 15a in a sub scanning direction orthogonal to the main scanning direction. The moving mechanism includes a guide rail that movably supports the carriage 15a in the sub scanning direction, a traction cord for pulling the carriage 15a, and a winding mechanism for winding the traction cord (one set is arranged at each end portion of the guide rail).

Figure 6:
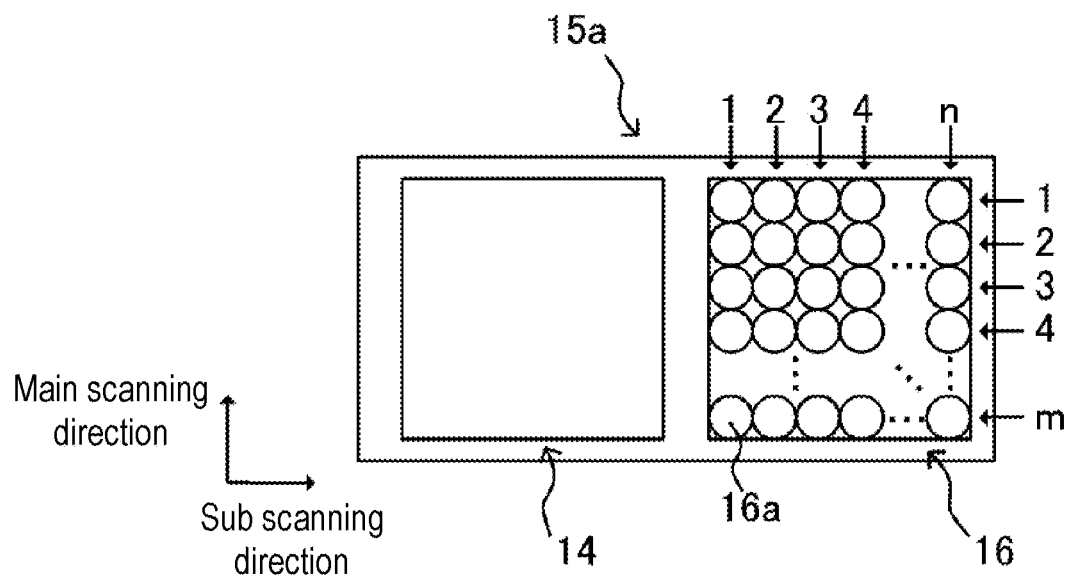
FIG. 6 is a schematic view (as viewed from below) showing the arrangement of a print head and a film-forming portion in the inkjet printer according to the fourth embodiment of the present disclosure.
Figure 7:
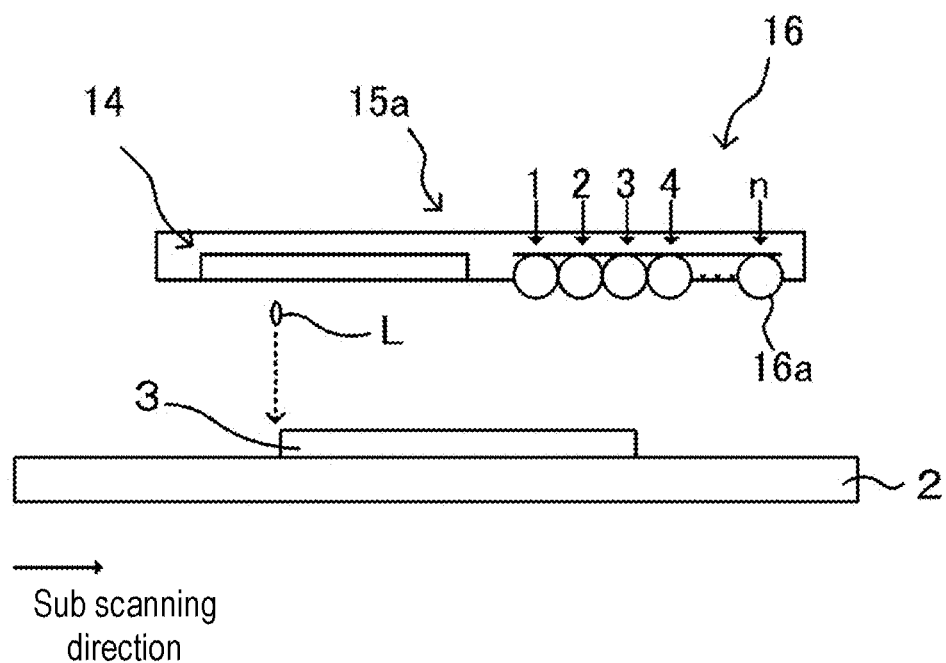
FIG. 7 is a schematic view (as viewed from the side) showing the arrangement of the print head and the film-forming portion in the inkjet printer according to the fourth embodiment of the present disclosure.

The film-forming portion 16 includes a plurality of external stimulus application devices 16a for applying an external stimulus for forming a film from the glossy ink composition applied to the substrate 2. As shown in FIGS. 6 and 7, the film-forming portion 16 is mounted on the carriage 15a described above so that the external stimulus application devices 16a are aligned in the sub scanning direction with the print head 14. In the film-forming portion 16, as shown in FIGS. 6 and 7, the plurality of external stimulus application devices 16a are arranged in m rows and n columns (m and n are integers greater than or equal to one), the row being the arrangement in the main scanning direction and the column being the arrangement in the sub scanning direction. These external stimulus application devices 16a are configured so that turning on/off can be controlled independently at least for each column. An arbitrary radiation irradiating device (e.g., lamp such as an LED in the case of an ultraviolet irradiating device etc.) or an arbitrary heating device (e.g., element that radiates heat ray) described in the first embodiment can be used for the external stimulus application device 16a.

The controller 17 controls the conveying mechanism 11 (e.g., belt conveyor or drive mechanism), the ink supply mechanism 13 (e.g., driving device), the print head 14 (e.g., piezoelectric element or heater), the drive mechanism 15 (e.g., winding mechanism), and the film-forming portion 16, and performs a glossy layer forming process of forming the metallic glossy layer 3 on the substrate 2.

To perform the process, the controller 17 is configured including a storage device (hard disk, flash memory, etc.) that stores various types of programs and data, a processor (Central Processing Unit (CPU) etc.) that executes the program stored in the storage device and actually executes the printing process using the various types of data, a main memory of the processor, and various types of interfaces. The controller 17 may be, for example, a personal computer.

(Glossy Layer Forming Process)

The glossy layer forming process is started with provision of image data for forming the metallic glossy layer 3 and number X of columns of the external stimulus application device for turning off from the external host computer, and the like as a trigger. The image data includes data of the presence or absence of the ejection of the glossy ink composition for each pixel.

First, the controller 17 controls the conveying mechanism 11 to move the substrate 2 to the printing start position.

Next, the controller 17 controls the drive mechanism 15 to relatively move the print head 14 in the sub scanning direction at a constant conveyance speed with respect to the substrate 2 (see FIG. 7). During this movement, the controller 17 controls the print head 14 to cause the glossy ink composition to be ejected from the nozzles in the form of droplets (droplet L in FIG. 7) at the timing the nozzle of the print head 14 reached the position (designated by the image data) of the pixel that ejects the glossy ink composition. Furthermore, during the movement, the first column to the Xth column of the external stimulus application device are turned off (no external stimulus is applied. e.g., turned off), and the other external stimulus application device is turned on (external stimulus is applied e.g., turned on). Thus, a standby time (period in which external stimulus is not applied) from the application of the glossy ink composition to the application of the external stimulus can be provided, and the length of the standby time, that is, the degree of the metallic gloss (degree of roughness, degree of specularity etc.) can be controlled by controlling the number of external stimulus application devices to be turned off. Thus, the first row of the metallic glossy layer 3 is printed.

Thereafter, the controller 17 controls the conveying mechanism 11 to send the substrate 2 by one pixel in the main scanning direction. Thereafter, the controller 17 ejects the ink while moving the print head 14 in the sub scanning direction in a similar manner as described above, and prints the second row of the metallic glossy layer 3. The controller 17 repeats the above to print each row of the metallic glossy layer 3. The entire metallic glossy layer 3 is printed by printing each row. In this manner, the controller 17 controls the relative movement of the print head 14 with respect to the substrate 2 (substrate 2 side may be moved), and the standby time from the application of the glossy ink composition to the application of the external stimulus to print the metallic glossy layer 3 having a desired gloss level.

The print head 14 may be provided with a plurality of nozzles, in which case the controller 17 sends the substrate 2 in the main scanning direction by the number of pixels of the number of nozzles.

The number X of columns of the external stimulus application device to be turned off can be obtained based on the desired gloss level, the ejection amount of the glossy ink composition, and the conveyance speed in the sub scanning direction.

For example, since the degree of metallic gloss and the standby time at a specific ink ejection amount correspond to each other, by creating a correspondence table of both in advance, the standby time corresponding to the degree of the desired metallic gloss is obtained based on the correspondence table.

As described in the second modified example, since the size of the droplet and the speed of wet-spreading are in a proportional relationship, the standby time required under the ejection amount is obtained based on the proportional relationship according to the standby time and the ejection amount of the glossy ink composition obtained above.

The standby time is divided by the conveyance speed in the sub scanning direction to obtain a length of the column of external stimulator corresponding to the standby time.

Finally, the length of the column of the external stimulator is divided by the length per one column of the external stimulus application device to obtain the number X of columns of the external stimulus application device to be turned off.

(Effect of fourth embodiment) The inkjet printer 10 according to the fourth embodiment differs from the conventional inkjet printer in that the external stimulus application device 16a of the film-forming portion 16 can be controlled for every column. Thus, in the inkjet printer 10, the standby time from the application of the glossy ink composition to the application of the external stimulus can be controlled such that the desired gloss level is obtained through a simple and easy control of changing the number of columns of the external stimulus application device 16a to be turned off. Therefore, according to the inkjet printer 10, the manufacturing method according to the first embodiment can be suitably performed.

Ninth Modified Example

The undercoating layer in the first embodiment and the like may also be formed by the inkjet printer 10. In this case, the undercoating layer is formed through a process similar to the glossy layer forming process (same ink composition is used. Another ink composition for the undercoating layer may be prepared). However, the external stimulus application device 16a is not turned off, and the ink composition is cured immediately. A metallic glossy layer is formed on the undercoating layer so that the undercoating layer is hidden, and hence the appearance of the printed matter is not affected.

Tenth Modified Example

In the fourth embodiment, the user calculates the number X of columns of the external stimulus application device to be turned off and inputs it to the controller 17, but instead, an index of a desired gloss level may be input to the controller 17 and the controller 17 may obtain the number of columns X (i.e., standby time from application of droplets to curing) from the index. As described above, the controller 17 can change the standby time from the application of droplets to curing by changing the number X of columns of the external stimulus application device to be turned off.

Eleventh Modified Example

In the fourth embodiment, each configuring element of the inkjet printer 10 (in particular, portion on which the substrate 2 of the conveying mechanism 11 is mounted) is preferably arranged in a housing that prevents entering of external stimulus for forming a film from the glossy ink composition from the outside of the inkjet printer 10. For example, when a radiation film-forming system is adopted for the glossy ink composition, the inkjet printer 10 is preferably arranged in a housing (e.g., dark room) that shields radiation (e.g., ultraviolet light) used in the system. Furthermore, for example, when the thermal film-forming system is adopted for the glossy ink composition, and the environmental temperature is high enough to completely volatilize the volatile solvent in the glossy ink composition, the inkjet printer 10 is preferably installed in the thermal insulation housing. Thus, during the standby time from the application of the droplet of the glossy ink composition to the application of the external stimulus, the fluidity of the droplet can be reliably maintained to an extent the droplet can be wet-spread on the surface to be printed.

Twelfth Modified Example

In the case in which the glossy ink composition containing a solvent is used, the inkjet printer 10 according to the fourth embodiment preferably further includes a drying device for completely or partially evaporating the solvent. In particular, the drying device is preferably disposed on the carriage 15a between the print head 14 and the film-forming portion 16. Thus, the solvent in the glossy ink composition can be evaporated to reduce the amount of solvent in the glossy ink composition to less than or equal to a desired amount, for example, to an extent the film formation of the glossy ink composition is not inhibited.

Thirteenth Modified Example

In the embodiments and the modified examples described above, the scaly particles of aluminum are used as a material that brings about metallic gloss, but scaly particles of other metal may be used. For example, one metal selected from the group consisting of silver, gold, platinum, nickel, chromium, tin, zinc, indium, titanium, and copper or an alloy of two or more metals selected from this group can be used.

Fourteenth Modified Example

In the embodiments and the modified examples described above, a case in which the glossy ink composition is printed in the same form (e.g., any form of FIGS. 2A to 2D) on the surface to be printed has been described, but instead, printing may be performed in a hybrid form in which various forms are mixed.

For example, after printing a region with a glossy ink composition in a short standby time, the region is printed with the glossy ink composition in a long standby time so that a spherical cured product of the glossy ink composition (FIG. 2A and a flat cured product (FIG. 2D) are mixed thus forming a hybrid layer partially bonded to each other.

Furthermore, the ratio of the spherical cured product and the flat cured product in the hybrid layer can be easily adjusted by controlling the amount of glossy ink composition per unit area printed in a short standby time and the amount of glossy ink composition per unit area printed in a long standby time. For example, when printing a glossy ink composition with eight number of passes using the inkjet printer 10 according to the fourth embodiment, the ratio of the spherical cured product to flat cured product in the hybrid layer becomes substantially 3:1 if printing is performed with six passes in a short standby time and two passes in a long standby time.

As described above, in the present modified example, the degree of diffused reflection in the hybrid layer can be easily controlled by changing the ratio of the cured product of each shape present in the layer.

Fifteenth Modified Example

In the embodiments and modified examples described above, the standby time is controlled to control the metallic gloss, but in addition, another parameter known to affect the metallic gloss is controlled. For example, narrowing the interval between dots when printing a glossy ink composition approaches specular gloss or exhibits specular gloss, and widening the interval between dots exhibits non-specular metal gloss (glaring gloss). In the embodiments and modified examples described above, although a "film" is described as a configuration that spreads over a printing region (e.g., configuration in which dots are connected), a collection of separated dots is also included in a "film".

EXAMPLE (First example) First, a glossy ink having the following composition was prepared. –95 parts mass of ultraviolet curable resin (Mimaki Engineering Co., Ltd., LH-100 clear ink), 5 parts mass of aluminum pigment.

In the preparation of the glossy ink, first, a film made of polyethylene terephthalate having a smooth surface (surface roughness Ra of less than or equal to 0.02 μm) was prepared.

Subsequently, silicone oil was applied entirely to one side of this film. A film made of aluminum (hereinafter, also simply referred to as an "aluminum film") was formed on the side applied with the silicone oil by vapor deposition.

Subsequently, the film on which the aluminum film was formed was placed in LH-100 clear ink (manufactured by Mimaki Engineering Co., Ltd.), and the aluminum film was peeled and crushed from the film by irradiating ultrasonic waves. Next, this was input to a homogenizer and pulverized for about 8 hours to obtain a glossy ink in which scaly aluminum particles are dispersed. The concentration of aluminum particles in this glossy ink was 5% by weight.

Next, using an inkjet printer (manufactured by Mimaki Engineering Co., Ltd., flat bed type (Model No. UJF-7151 plus)), the glossy ink was printed in a band shape on a flexible film (manufactured by Higashiyama Film Co., Ltd., HK-31WF) under conditions of 600×900 dpi and 16 passes. In each pass, the flexible film was sequentially sent immediately to under the ultraviolet irradiation unit along the column direction of the ultraviolet irradiation lamp from a portion where the glossy ink was applied by the printer head, and the ultraviolet light was irradiated from the ultraviolet irradiation unit to the relevant portion according to any of the following irradiation conditions 1 to 4. The numbers of the columns of the ultraviolet irradiation unit are given in order along the column direction, with the column to which the flexible film is sent first being the first column.

Irradiation condition 1: All ultraviolet irradiation lamps are turned on. In an inkjet printer, the printer head and the ultraviolet irradiation unit are sufficiently close to each other, and thus the standby time from the application of the glossy ink to the flexible film and the irradiation of the ultraviolet light thereto (hereinafter simply referred to as standby time) can be regarded as substantially 0 second.

Irradiation condition 2: The ultraviolet irradiation lamps in the second column are not turned on, and the other ultraviolet irradiation lamps are turned on. In this case, the standby time is increased by 9.49 seconds compared to condition 1.

Irradiation condition 3: The ultraviolet irradiation lamps in the first to third columns are not on, and the other ultraviolet irradiation lamps are turned on. In this case, the standby time is increased by 14.24 seconds compared to condition 1.

Irradiation condition 4: The ultraviolet irradiation lamps in the first to fourth columns are not turned on, and the other ultraviolet irradiation lamps are turned on. In this case, the standby time is increased by 19.00 seconds compared to condition 1.

The microphotographs of the print layers 1 to 4 obtained by curing the glossy ink applied on the flexible film by irradiating the ultraviolet light under the irradiation conditions 1 to 4 are shown in FIGS. 8A to 8D.

Figure 8A:
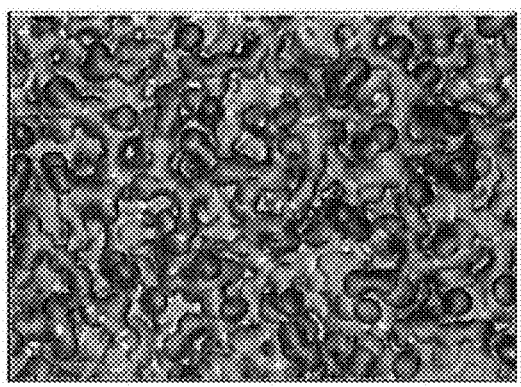
FIGS. 8A to 8D are microphotographs (magnification: 150 times) of the surface of the print layer of the glossy ink composition when the standby time is changed.
Figure 8B:
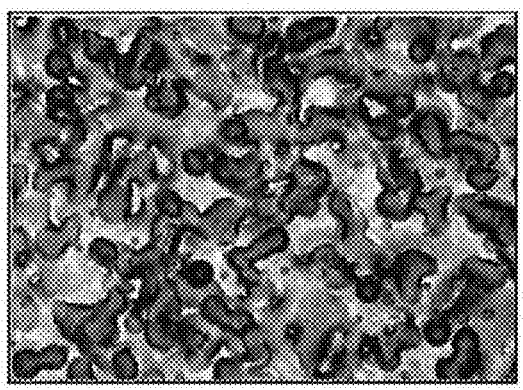
Figure 8C:
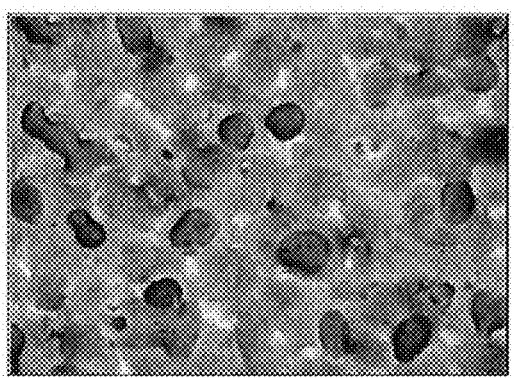
Figure 8D:
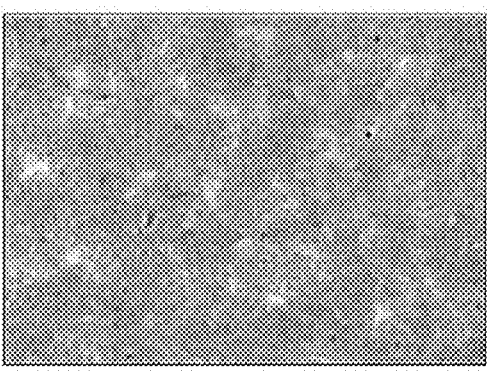

The print layer 1 had a surface rich in irregularities as shown in FIG. 8A. The irregularities are considered to reflect the shape of the droplets of the glossy ink applied to the flexible film as is. The print layer 1 had a texture rough in touch and visual observation, and no gloss was observed.

The print layer 2 had a surface rich in irregularities as shown in FIG. 8B. The irregularities are considered to reflect most of the shape of the droplets of the glossy ink applied to the flexible film as is. The print layer 2 had a rough touch, but appeared sparkling.

The print layer 3 had a surface including a protrusion (dark part) and a flat part (bright part), as shown to FIG. 8C. This is assumed to be the result of the droplets of the glossy ink wet-spreading on the flexible film during the standby time from the application of the glossy ink to the flexible film to the irradiation of the ultraviolet light thereto. The print layer 3 had a touch between the print layer 2 and the print layer 4, appeared sparkling and although cloudy an image of the surrounding appeared.

The print layer 4 had a substantially flat surface as shown in FIG. 8D. This is assumed to be the result of the droplets of the glossy ink wet-spreading on the flexible film and the adjacent droplets connect to each other during the above-mentioned standby time. The print layer 4 had a smooth touch, and the image of the surrounding was appeared like a mirror surface.

From the above observations, it was found that as the standby time increased, the surface of the print layers 1 to 4 gradually became smooth, and the degree of metallic gloss increased accordingly.

Furthermore, comparing the results of print layer 1 and print layer 2, it can be seen that the orientation of the aluminum pigment in the droplet changed and the degree of metallic gloss enhanced even in the standby time of an extent the shape of the droplet of the glossy ink does not change.

Second Example

The following parameters were measured for print layers 1 to 4.

Parameters indicating the surface roughness of the print layer: Sa value, Sz value, Spc value, Sdq value, Sdr value, Vvv value, Vvc value;

Parameter indicating general physical property of the print layer: coating film thickness;

Parameter indicating the gloss of the surface of the print layer: GLOSS value, HAZE value, Log HAZE value, DOI value, Rspec value, RIQ value, absolute reflectance.

The Sa value, the Sz value, the Spc value, the Sdq value, the Sdr value, the Vvv value, the Vvc value, and the coating film thickness were measured with a shape analysis laser microscope (model number VK-X200 Series) manufactured by KEYENCE Corporation.

The GLOSS value, the HAZE value, the LogHAZE value, the DOI value, the Rspec value, and the RIQ value were measured at an incident light angle of 20° by a gloss meter appearance analyzer (model number RHOPOINT-IQ) manufactured by KONICA MINOLTA Corporation.

The absolute reflectance was measured at an incident light angle of 60° by an ultraviolet visible near infrared spectrophotometer V-770 manufactured by JASCO Corporation.

The measurement results are summarized in the following table.

TABLE 1

| Print layer | Sa [μm] | Sz [μm] | Spc [mm$^{-1}$] | Sdq | Sdr | Vvv [ml/m$^2$] | Vvc [ml/m$^2$] | Coating film thickness [μm] |
|---|---|---|---|---|---|---|---|---|
| 1 | 3.83 | 44.78 | 2833.97 | 2.28 | 2.02 | 0.54 | 5.84 | 20.04 |
| 2 | 3.84 | 49.47 | 1911.32 | 1.48 | 0.90 | 0.51 | 5.87 | 16.50 |
| 3 | 2.80 | 37.05 | 1376.92 | 1.18 | 0.60 | 0.29 | 4.85 | 14.62 |
| 4 | 0.76 | 9.84 | 716.22 | 0.61 | 0.18 | 0.13 | 1.11 | 4.56 |

TABLE 2

| Print layer | GLOSS [GU] | HAZE [HU] | LogHAZE | DOT [%] | Rspec [GU] | RIQ [%] | Absolute reflectance [%] |
|---|---|---|---|---|---|---|---|
| 1 | 11.94 | 5.48 | 135.23 | 1.64 | 0.39 | 1.56 | 3.62 |
| 2 | 37.02 | 23.72 | 436.48 | 1.78 | 1.64 | 1.28 | 6.97 |
| 3 | 59.19 | 65.26 | 809.17 | 11.07 | 8.68 | 1.80 | 18.48 |
| 4 | 331.09 | 19.81 | 384.20 | 35.30 | 71.70 | 16.24 | 26.76 |

Third Example

The glossy ink was printed in a band shape on a flexible film similar to the first example other than that the pixel density (dpi) and the number of passes were changed to any of the print conditions A to E shown in Table 3 below and the conveyance speed was adjusted so that the standby time is as shown in Table 4. In the print conditions A to E, the amount of ink ejected from each nozzle in each pass is adjusted so that the amount of ink per one dot finally formed is the same as in the first example. For example, if the ejection amount per nozzle when the number of passes is one is assumed as a reference, the ejection amount per nozzle when the number of passes is eight is 1/8.

TABLE 3

|  | DPI | Number of passes |
| --- | --- | --- |
| First example | 600 × 900 | 16 |
| Print condition A | 600 × 600 | 6 |
| Print condition B | 600 × 600 | 8 |
| Print condition C | 600 × 900 | 12 |
| Print condition D | 1200 × 1200 | 16 |
| Print condition E | 1200 × 1200 | 24 |

In the print conditions A to E, the conveyance speed is different from the conveyance speed of the first example, and thus the standby time when the ultraviolet irradiation unit is controlled according to the irradiation conditions 1 to 4 also changes according to the conveyance speed. The standby time when printing is performed under a combination of the print conditions A to E and the irradiation conditions 1 to 4 is summarized in table 4.

TABLE 4

|  | Standby time (seconds) | | | |
| --- | --- | --- | --- | --- |
|  | Irradiation condition 1 | Irradiation condition 2 | Irradiation condition 3 | Irradiation condition 4 |
| First example | 0 | 9.49 | 14.24 | 19.00 |
| Print condition A | 0 | 3.56 | 5.34 | 7.13 |
| Print condition B | 0 | 4.74 | 7.12 | 9.50 |
| Print condition C | 0 | 7.12 | 10.68 | 14.25 |
| Print condition D | 0 | 16.36 | 24.57 | 32.78 |

The print layer printed under the combination of the print conditions A to E and the irradiation condition 1 was the same as the print layer 1 of the first example, no gloss was observed.

The print layer printed under the combination of the print conditions A to E and the irradiation condition 2 exhibited the metallic gloss similar to the print layer 2 of the first example.

The print layer printed under the combination of the print conditions A to E and the irradiation condition 3 exhibited the metallic gloss similar to the print layer 3 of the first example.

The print layer printed under the combination of the print conditions A to E and the irradiation condition 4 exhibited the metallic gloss similar to the print layer 4 of the first example.

In summary, in each print layer printed under the combinations of the print conditions A to E and the irradiation conditions 1 to 4, the degree of metallic gloss changed according to the irradiation condition without depending on the print conditions.

Generally, as the size of the ink droplet becomes smaller, the influence of its surface tension becomes larger, and the droplets are less likely to wet-spread on the surface to be printed. On the other hand, in the present example, the standby time is set longer as the size of the droplets of the glossy ink decreases (i.e., as the ejection amount per nozzle decreases) so as to offset the difficulty in wet-spreading.

From the above results, it was found that the wet-spreading of the glossy ink can be controlled not only by changing the length of the standby time but also by providing a constant standby time and changing the size of the droplet of the glossy ink ejected from the printer head.

What is claimed is:

1. A printed matter exhibiting metallic gloss, comprising:
a substrate; and
a metallic glossy layer, being formed on the substrate, and the metallic glossy layer containing scaly particles having a metal;
wherein
in the metallic glossy layer, the scaly particles are oriented to be substantially parallel to a surface of the metallic glossy layer; and
the surface of the metallic glossy layer has a DOI value of greater than or equal to 20% and a Sa value of less than or equal to 2 μm.

2. The printed matter according to claim 1, wherein
the surface of the metallic glossy layer further has at least one of the following physical properties,
a) Rspec value is greater than or equal to 10 GU or greater than or equal to 50 GU,
b) GLOSS value is greater than or equal to 100 GU,
c) Sz value is less than or equal to 4 μm,
d) Vvc value is less than or equal to 4 ml/m$^2$,
e) Coating film height is greater than or equal to 3 μm and less than or equal to 30 μm.

3. The printed matter according to claim 1, wherein
the metallic glossy layer includes a cured product of an external stimulus film-forming resin which forms a film by an external stimulus including radiation or heat.

4. The printed matter according to claim 3, wherein
a flat layer of a cured product of the same kind of resin as the external stimulus film-forming resin is provided between the metallic glossy layer and the substrate.

5. A printed matter exhibiting metallic gloss, comprising:
a substrate; and
a metallic glossy layer, being formed on the substrate, and the metallic glossy layer containing scaly particles having a metal;
wherein
the metallic glossy layer includes a plurality of protrusions; and
the scaly particles are oriented substantially in parallel with a surface of the protrusion in each of the plurality of protrusions.

6. The printed matter according to claim 5, wherein
a surface of the metallic glossy layer has a log HAZE value of greater than or equal to 200 and less than or equal to 1400, and an Sdq value of greater than or equal to 0.7 and less than or equal to 2.

7. The printed matter according to claim 6, wherein
the surface of the metallic glossy layer further has at least one of the following physical properties,
a) Log HAZE value is greater than or equal to 300 and less than or equal to 900,
b) GLOSS value is greater than or equal to 15 GU and less than 100 GU,
c) Sdr value is less than or equal to 2,
d) Spc value is greater than or equal to 1000 mm$^{-1}$ and less than or equal to 2200 mm$^{-1}$,
e) Vvc value is greater than or equal to 1.5 ml/m$^2$ and less than or equal to 5.8 ml/m$^2$.

* * * * *